(12) United States Patent
Gardner et al.

(10) Patent No.: US 7,029,513 B2
(45) Date of Patent: *Apr. 18, 2006

(54) REACTANT DELIVERY APPARATUSES

(75) Inventors: James T. Gardner, Cupertino, CA (US); Sujeet Kumar, Fremont, CA (US); Ronald M. Cornell, Livermore, CA (US); Ronald J. Mosso, Fremont, CA (US); Xiangxin Bi, San Ramon, CA (US)

(73) Assignee: NanoGram Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/346,271

(22) Filed: Jan. 17, 2003

(65) Prior Publication Data

US 2003/0127316 A1 Jul. 10, 2003

Related U.S. Application Data

(62) Division of application No. 09/753,484, filed on Jan. 3, 2001, now Pat. No. 6,508,855, which is a division of application No. 09/188,670, filed on Nov. 9, 1998, now Pat. No. 6,193,936.

(51) Int. Cl.
*C07C 1/00* (2006.01)
*C01B 33/00* (2006.01)
*B01D 47/00* (2006.01)
*C21C 5/54* (2006.01)
*C21C 5/52* (2006.01)

(52) U.S. Cl. .................. 75/330; 75/10.1; 75/10.13; 423/210; 423/324; 204/157.15; 204/157.41

(58) Field of Classification Search ............... 75/330, 75/10.1, 10.13; 423/210, 324; 204/157.15, 204/157.41; 205/157.15, 157.41
See application file for complete search history.

(56) References Cited

U.S. PATENT DOCUMENTS 3,733,060 A 5/1973 Merritt (Continued)

FOREIGN PATENT DOCUMENTS

| FR | 2 677 558 | 12/1992 |
| WO | WO 98/37165 | 8/1998 |
| WO | WO 98/37961 | 9/1998 |

OTHER PUBLICATIONS

Cauchetier et al., "Nanocomposite Si/C/N Powder Production by Laser-Aerosol Interaction", J. Am. Ceramic Soc., vol. 77, No. pp. 993-998 (no month, 1994).*

"Aerosol Processing of Materials", by Gurav et al., vol. 19, No. 4, 1993, pp. 411-452.

"Nanocomposition Si/C/N Powder Production by Laser-Aerosol Interaction", by Cauchetier et al., Journal of the Americal Ceramic Society, vol. 77, No. 4, (1994), pp. 993-998, no month.

(Continued)

*Primary Examiner*—Edna Wong
(74) *Attorney, Agent, or Firm*—Patterson, Thuente, Skaar & Christensen, P.A.; Peter S. Dardi

(57) ABSTRACT

An aerosol delivery apparatus is used to deliver an aerosol into a reaction chamber for chemical reaction to produce reaction products such as nanoparticles. A variety of improved aerosol delivery approaches provide for the production of more uniform reaction products. In preferred embodiments, a reaction chamber is used that has a cross section perpendicular to the flow of reactant having a dimension along a major axis greater than a dimension along a minor axis. The aerosol preferably is elongated along the major axis of the reaction chamber.

20 Claims, 13 Drawing Sheets

U.S. PATENT DOCUMENTS

| | | |
|---|---|---|
| 3,780,943 A | 12/1973 | Lilja |
| 4,071,196 A | 1/1978 | Burke et al. |
| 4,444,734 A | 4/1984 | Mastrup et al. |
| 4,530,450 A | 7/1985 | Nandagiri |
| 4,629,478 A | 12/1986 | Browner et al. |
| 4,640,839 A | 2/1987 | Hsu |
| 4,642,227 A | 2/1987 | Flagan et al. |
| 4,678,657 A | 7/1987 | Sood et al. |
| 4,687,929 A | 8/1987 | Browner et al. |
| 4,762,995 A | 8/1988 | Browner et al. |
| 4,924,097 A | 5/1990 | Browner et al. |
| 4,963,289 A | 10/1990 | Ortiz et al. |
| 4,994,107 A | 2/1991 | Flagan et al. |
| 5,160,665 A | 11/1992 | Owada et al. |
| 5,173,274 A | 12/1992 | Owen et al. |
| 5,175,433 A | 12/1992 | Browner et al. |
| 5,247,842 A | 9/1993 | Kaufman et al. |
| 5,429,657 A * | 7/1995 | Glicksman et al. ............ 75/351 |
| 5,589,300 A | 12/1996 | Fauteux et al. |
| 5,609,798 A | 3/1997 | Liu et al. |
| 5,622,750 A | 4/1997 | Kilian et al. |
| 5,725,153 A | 3/1998 | Wang et al. |
| 5,770,126 A | 6/1998 | Singh et al. |
| 5,788,738 A | 8/1998 | Pirzada et al. |
| 5,852,768 A | 12/1998 | Jacobsen et al. |
| 5,868,322 A | 2/1999 | Loucks, Jr. et al. |
| 5,958,348 A * | 9/1999 | Bi et al. ................ 422/186.04 |
| 6,248,216 B1 * | 6/2001 | Bi et al. ................ 204/157.15 |
| 6,508,855 B1 * | 1/2003 | Gardner et al. ............... 75/330 |
| 6,607,706 B1 * | 8/2003 | Kumar et al. ............... 423/599 |
| 6,680,041 B1 * | 1/2004 | Kumar et al. ............... 423/605 |

OTHER PUBLICATIONS

"Preparation of Spherical $LiCoO_2$ Fine Powders by Ultrasonic Spray (Thermal) Decomposition and its Application to Cathode Active Materials in Lithium Secondary Batteries", by Ogihara et al., Journal of the Ceramic Society of Japan, vol. 101, No. 10, pp. 1159-1163, 1993. (Translation from Japanese included.), no month.

"Synthesis of Ceramic Oxide Powders by Microwave Plasma Pyrolysis", by Vollath et al., Journal of Materials Science, 28, (1993), pp. 5943-5948, no month.

"Synthesis of Nanoparticles by a Laser Vaporization Controlled Condensation Technique", by El-Shall et al., SPIE, vol., 3123, (1997), pp. 98-109, no month.

"Synthesis of Nano-sized Barium Ferrite-Particles Using an Inorganic Dispersing Phase", by Lee et al., J. Appl. Phys. 73 (10), May 15, 1993, pp. 6266-6268.

"Synthesis of Superconducting Y-Ba-Cu-O Powders by the Spray Drying Method", by Awano et al., (1988), pp. 426-427, no month.

* cited by examiner

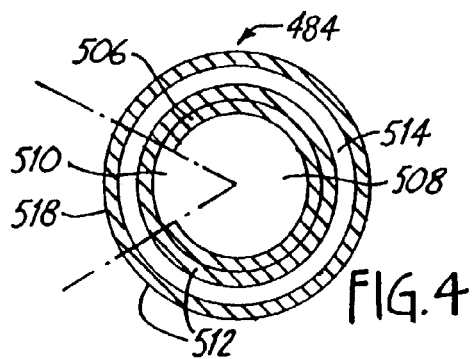
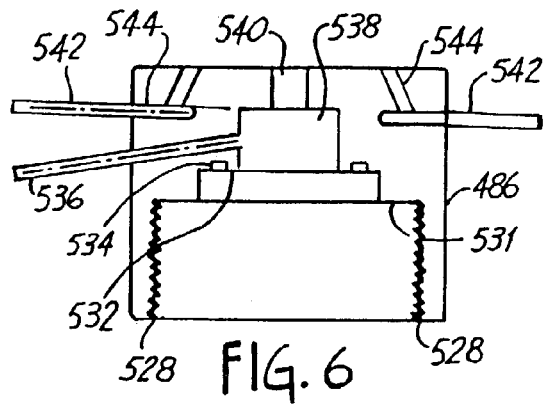
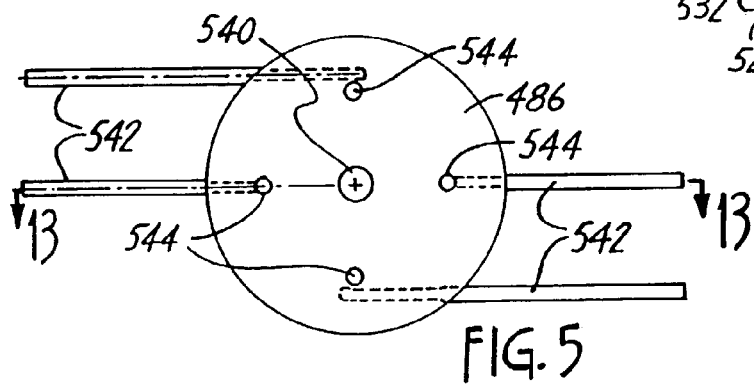
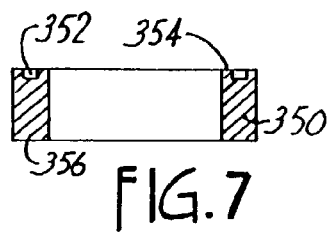
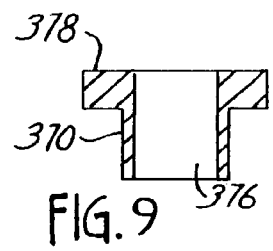
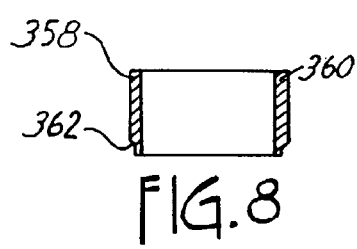
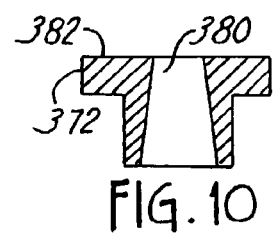
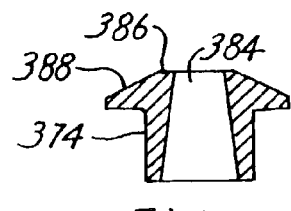

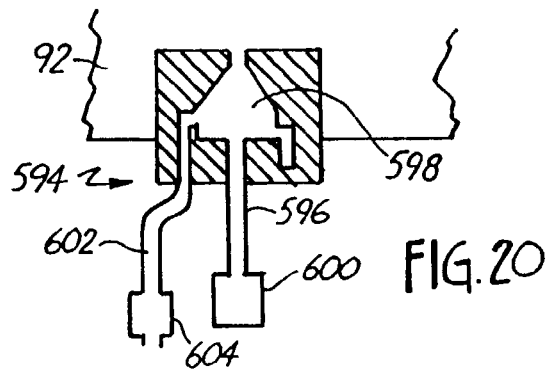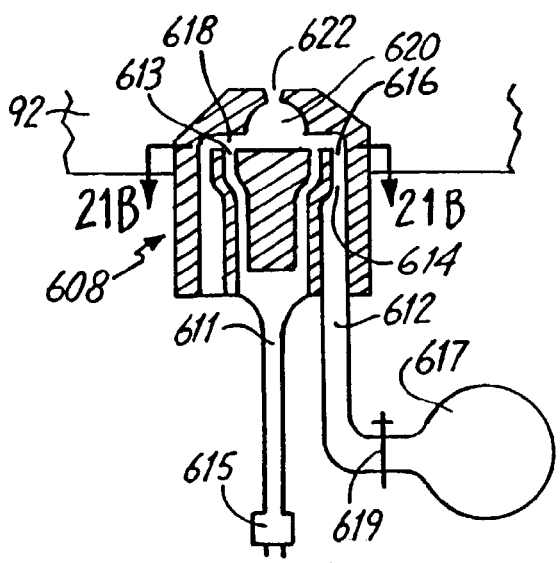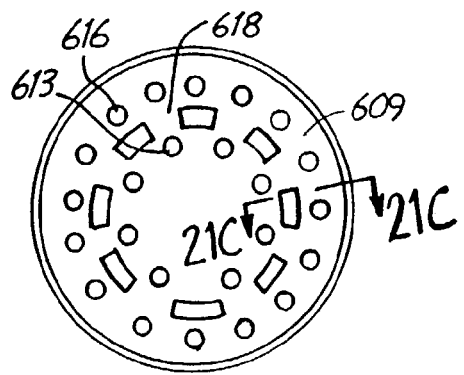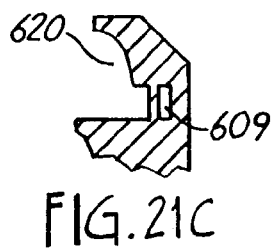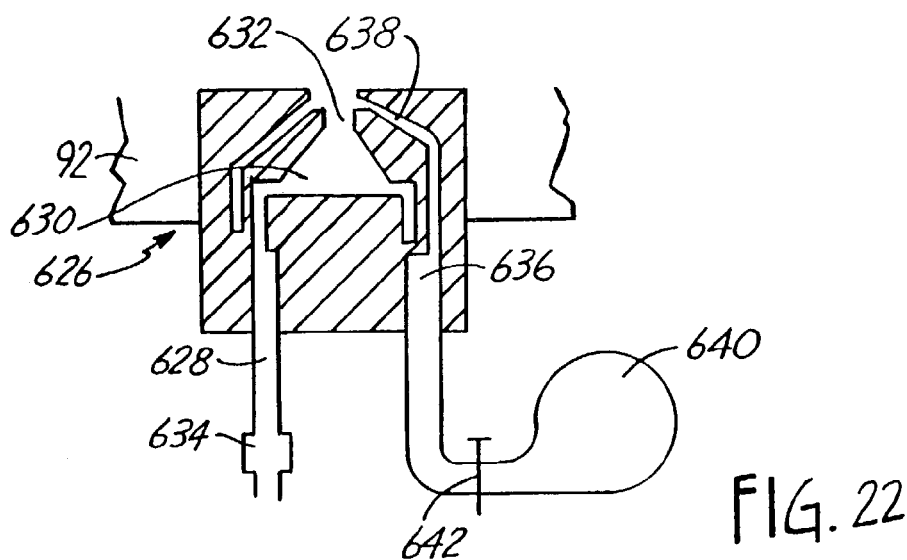

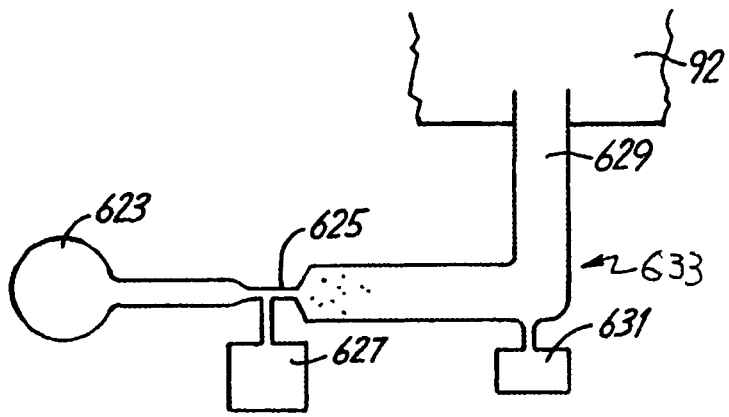
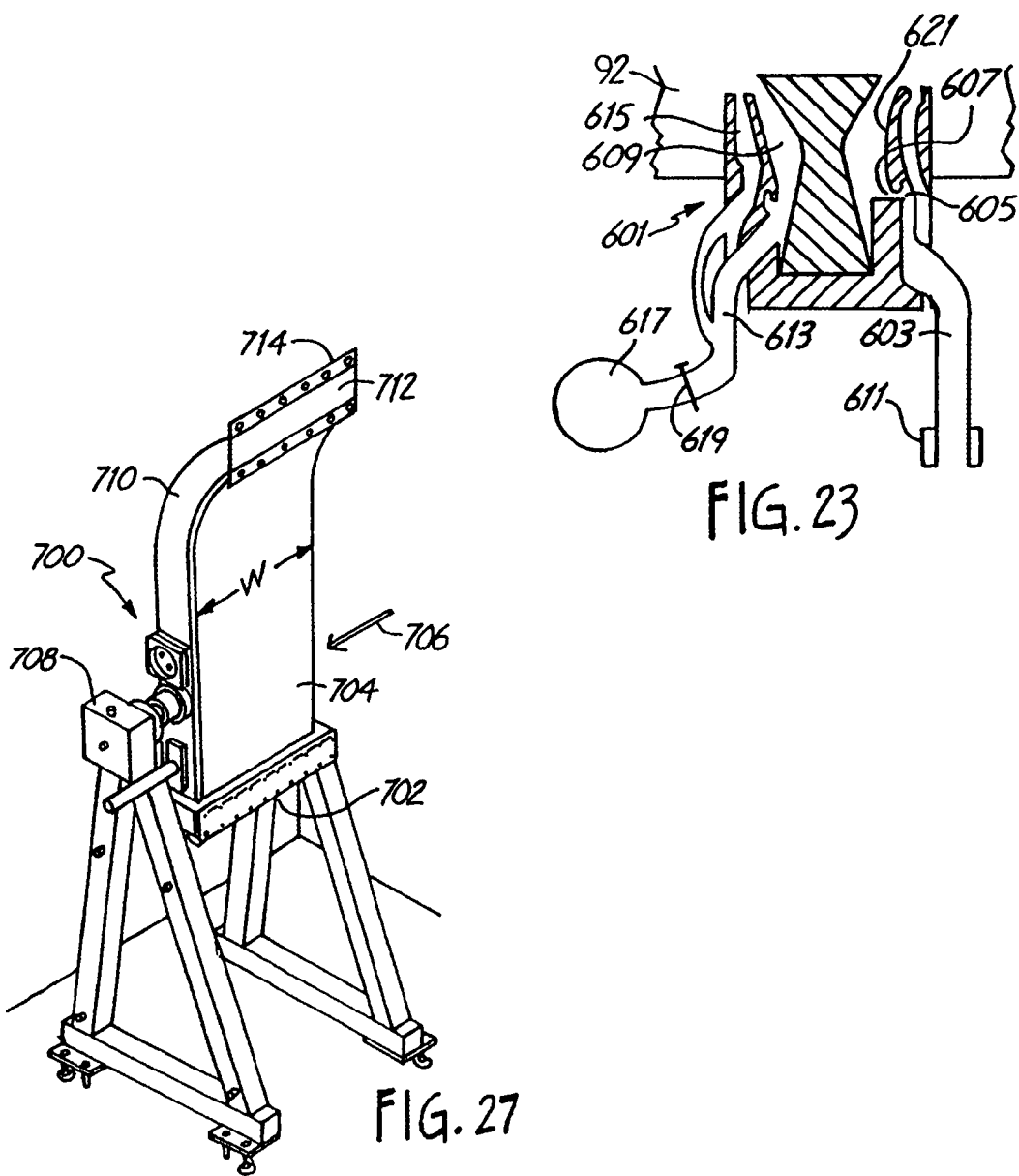

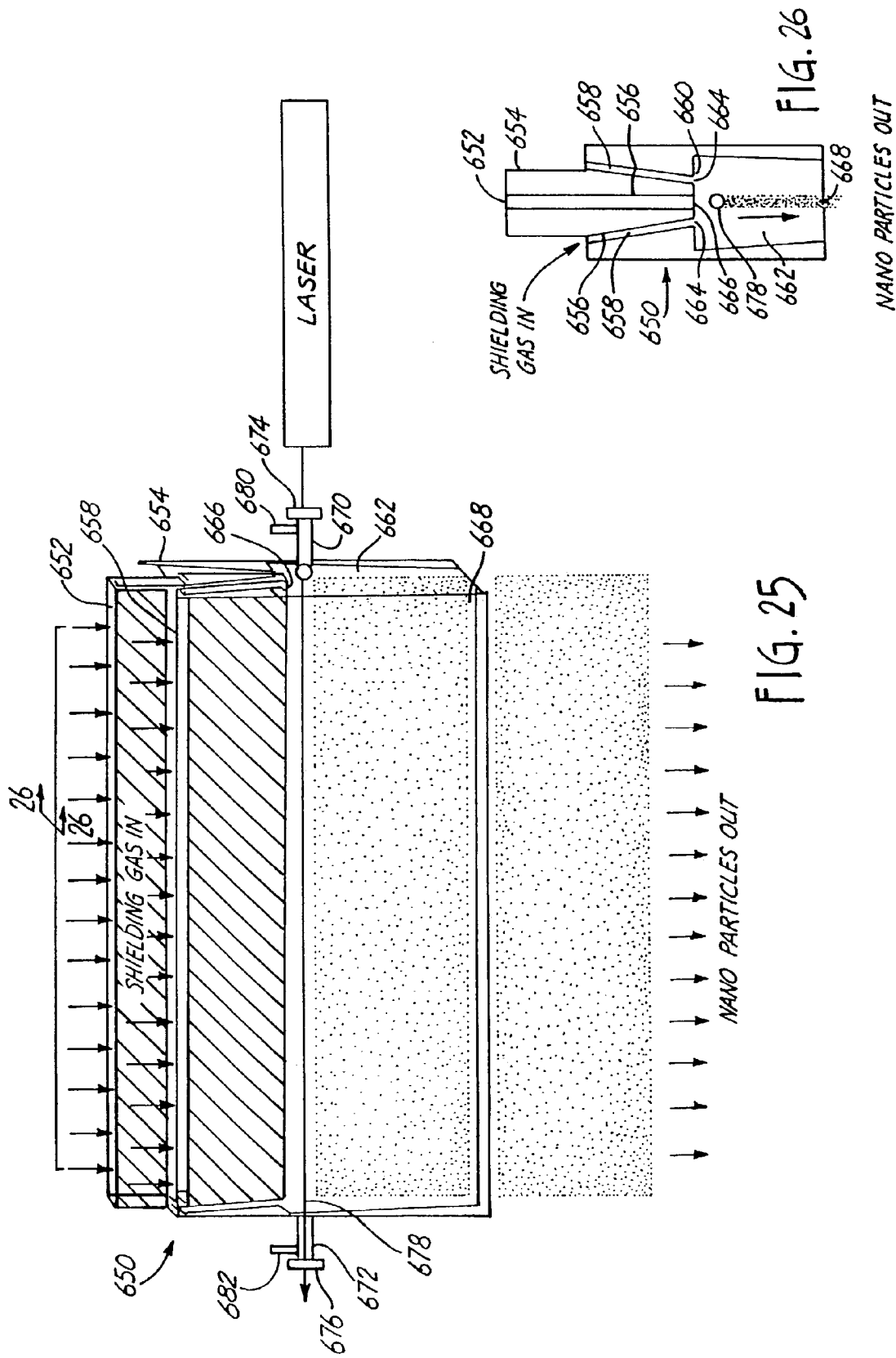

US 7,029,513 B2

REACTANT DELIVERY APPARATUSES

CROSS REFERENCE TO RELATED APPLICATIONS

This application is a divisional of U.S. patent application Ser. No. 09/753,484, filed on Jan. 3, 2001 now U.S. Pat. No. 6,508,855 to Gardner et al., entitled "Reactant Delivery Apparatuses," which is a divisional of U.S. patent application Ser. No. 09/188,670, filed on Nov. 9, 1998 now U.S. Pat. No. 6,193,936 to Gardner et al., entitled "Reactant Delivery Apparatuses," both of which are incorporated herein by reference.

FIELD OF THE INVENTION

The invention relates to reaction systems with an aerosol reactant delivery apparatus. The reaction systems are particularly useful for the production of chemical powders.

BACKGROUND OF THE INVENTION

Advances in a variety of fields have created a demand for many types of new materials. In particular, a variety of chemical powders can be used in many different processing contexts. Specifically, there is considerable interest in the application of ultrafine or nanoscale powders that are particularly advantageous for a variety of applications involving small structures or high surface area materials. This demand for ultrafine chemical powders has resulted in the development of sophisticated techniques, such as laser pyrolysis, for the production of these powders.

Some of these production techniques involve flow reactions that result in the formation of the powders in a gaseous stream. To commercially exploit these particle production processes on a practical scale, the processes must be capable of efficiently producing large quantities of particles in a reasonable period of time. These large quantities of particles must be harvested from the gaseous stream in which they are produced.

SUMMARY OF THE INVENTION

In a first aspect, the invention pertains to a reaction system comprising:

- an elongated reaction chamber having an outlet along a reactant path, the reaction chamber having a cross section perpendicular to the reactant path with a dimension along a major axis greater than a dimension along a minor axis; and
- an aerosol delivery apparatus comprising an aerosol generator, the aerosol delivery apparatus being connected to the reaction chamber to deliver an aerosol along the reactant path, the aerosol being elongated along the major axis of the reaction chamber relative to the extension of the aerosol along the minor axis of the reaction chamber.

In another aspect, the invention pertains to a method for producing particles, the method comprising introducing a reactant stream into a reaction chamber, the reactant stream having a cross section perpendicular to the flow direction of the reactant stream with a dimension along a major axis greater than a dimension along a minor axis and the reactant stream comprising an aerosol.

In a further aspect, the invention pertains to a reaction system comprising:

- a reaction chamber having an outlet along a reactant path; and
- an aerosol delivery apparatus connected to the reaction chamber to deliver an aerosol along the reaction path, the aerosol delivery apparatus comprising an ultrasonic aerosol generator having an atomization surface operably connected to an ultrasonic transducer, the atomization surface having an opening connected to a liquid flow conduit such that flow from the conduit flows along the atomization surface.

Moreover, the invention pertains to a reaction system comprising:

- a reaction chamber having an outlet along a reactant path; and
- an aerosol delivery apparatus comprising:
  - a delivery tube connected to the reaction chamber to deliver an aerosol along the reactant path;
  - a gas supply tube flowing into the delivery tube; and
  - an aerosol generator oriented to produce an aerosol along a path leading into the flow from the gas supply tube.

In another aspect, the invention pertains to a reaction system comprising:

- a reaction chamber having an outlet along a reactant path; and
- an aerosol delivery apparatus comprising:
  - a delivery tube connected to the reaction chamber to deliver an aerosol along the reactant path;
  - an aerosol chamber in fluid communication with the delivery tube, the aerosol chamber holding a supply of liquid;
  - a gas supply tube flowing into the aerosol chamber; and
  - an aerosol generator oriented to produce an aerosol within the aerosol chamber above the supply of liquid, the aerosol generator being connected to a liquid supply tube.

The invention further pertains to a method of producing particles, the method comprising introducing a reactant stream into a reaction chamber, the reactant stream intersecting a light beam path, the reactant stream comprising an aerosol comprising a compound that absorbs sufficient light energy to drive reactions resulting in particle formation.

BRIEF DESCRIPTION OF THE DRAWINGS

FIG. 1 is a schematic, perspective view of a reaction system.

FIG. 2 is schematic, sectional view of a laser pyrolysis reaction system, where the cross section is taken through the center of the system.

FIG. 3 is a fragmentary, sectional view of an aerosol delivery apparatus, where the cross section is taken through the center of the apparatus.

FIG. 4 is a top view of a mount of the aerosol delivery apparatus of FIG. 3.

FIG. 5 is a top view of a cap of the aerosol delivery apparatus of FIG. 3.

FIG. 6 is a sectional view of the cap of FIG. 5, taken along line 6-6 of FIG. 5.

FIG. 7 is a sectional side view of a spacer used in the aerosol delivery apparatus of FIG. 3, where the cross section is taken through the center of the spacer.

FIG. 8 is a sectional side view of a shim used in the aerosol delivery apparatus of FIG. 3, where the cross section is taken through the center of the shim.

FIG. 9 is a sectional, side view of an embodiment of a cap bushing for use in the aerosol delivery apparatus of FIG. 3, where the cross section is taken through the center of the cap bushing.

FIG. 10 is a sectional, side view of an alternative embodiment of a cap bushing for use in the aerosol delivery apparatus of FIG. 3, where the cross section is taken through the center of the cap bushing.

FIG. 11 is a sectional, side view of a second alternative embodiment of a cap bushing for use in the aerosol delivery apparatus of FIG. 3, where the cross section is taken through the center of the cap bushing.

FIG. 20 is a schematic, sectional side view of an embodiment of aerosol generator with a spill-return atomizer, where the cross section is taken through the center of the apparatus.

FIG. 21A is a schematic, sectional side view of an embodiment of an aerosol generator with a two-fluid internal-mix atomizer, where the cross section is taken through the center of the apparatus.

FIG. 21B is a schematic, sectional top view of the aerosol generator of FIG. 21A, taken along line B—B of FIG. 21A.

FIG. 21C is a schematic, fragmentary sectional view of the aerosol generator of FIG. 21A, taken along line C—C of FIG. 21B.

FIG. 22 is a schematic, sectional side view of an embodiment of an aerosol generator with a two-fluid external-mix atomizer, where the cross section is taken through the center of the apparatus.

FIG. 23 is a schematic, sectional side view of an embodiment of an aerosol generator with a gas blast atomizer, where the cross section is taken through the center of the apparatus.

FIG. 24 is a schematic, sectional side view of an alternative embodiment of a gas atomization aerosol generator using a venturi tube, where the cross section is taken through the center of the apparatus.

FIG. 25 is a schematic, perspective view of an elongated reaction chamber for performing laser pyrolysis, where the components of the reaction chamber are shown as transparent to reveal internal structure.

FIG. 26 is a schematic, sectional view of the reaction chamber of FIG. 25, taken along line 26—26 of FIG. 25.

FIG. 27 is a perspective view of an embodiment of an elongated reaction chamber for performing laser pyrolysis.

DETAILED DESCRIPTION OF THE PREFERRED EMBODIMENTS

Figure 1:
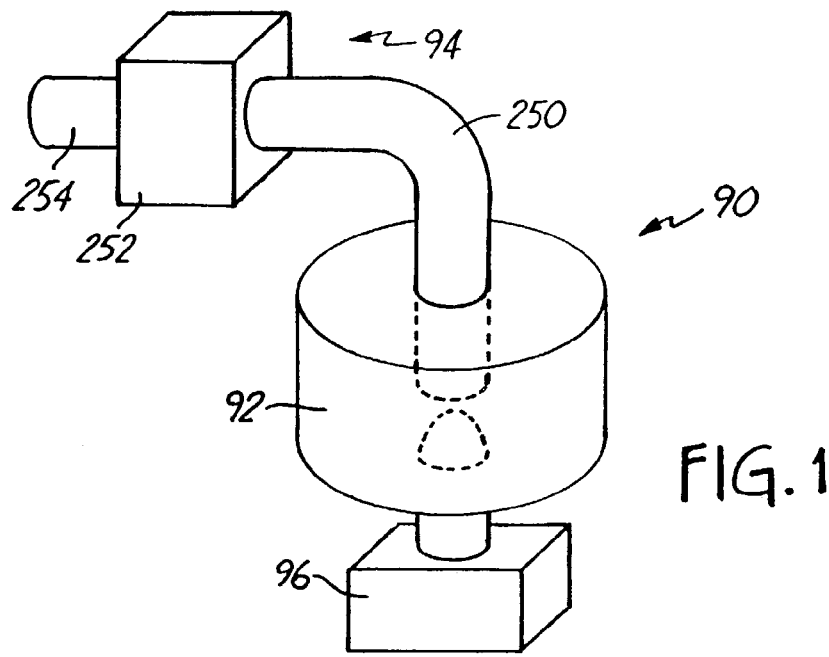

Reactant delivery apparatuses that deliver an aerosol can be used effectively for the delivery of reactants into flowing fluid based reaction systems. Improved reactant delivery systems provide for greater control over the properties of the aerosol delivered into the reaction system. In particular, several approaches can be used to produce a more uniform aerosol that can lead to a more uniform reaction product. Also, the aerosol delivery system can be adapted for commercial scale reaction systems that have an reaction chamber elongated in one dimension such that the reactant and product throughput can be increased while achieving an efficient and effective use of resources, including reactants and energy. In other words, a high production rate can be achieved with a high yield. The aerosol delivery apparatuses are useful for the production of chemical powders including, for example, nanoscale particles.

The aerosol delivery apparatus can be used effectively in "gas phase" reaction systems where the aerosol includes particles or droplets dispersed in a gas flow. In particular, the aerosol delivery apparatuses are useful to deliver reactants in a laser pyrolysis reaction chamber. Alternatively, the reaction chamber can be part of a flame production apparatus such as the apparatus described in U.S. Pat. No. 5,447,708 to Helble et al., entitled "Apparatus for Producing Nanoscale Ceramic Particles," incorporated herein by reference. Furthermore, the reaction chamber can be part of a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

Preferred particle production systems are based on laser pyrolysis. A high production rate laser pyrolysis apparatus is described in copending and commonly assigned patent application Ser. No. 08/808,850 now U.S. Pat. No. 5,989,514, entitled "Efficient Production of Particles by Chemical Reaction," filed on Feb. 28, 1997, incorporated herein by reference. Laser pyrolysis apparatuses are particularly suitable for the production of particles having an average diameter less than about 1000 nm, and more preferably from about 5 nm to about 500 nm.

Generally, relevant reaction systems, appropriately configured, can operate with gas phase reactants. If the reactants are limited to gas phase reactants, the types of materials that can be produced economically are limited significantly because the range of reactants is correspondingly limited. For example, many solid reactants cannot be used since their vapor pressures are so low at reasonable temperatures that little, if any, reactant can be introduced into a vapor phase. Also, some liquid reactants may be inconvenient or impractical for vapor delivery due to, for example, toxicity, cost, and/or low vapor pressures. Furthermore, aerosol delivery can avoid decomposition or premature reaction of a reactant that is unstable or highly reactive when delivered as a vapor. Thus, the availability of additional reactants for delivery as aerosols can provide approaches for the production of certain products that otherwise would not be practical.

The use of an aerosol delivery apparatus provides for the use of a wider range of reactants. For example, solid or liquid reactants can be dissolved into a solvent and delivered as an aerosol. In addition, liquid reactants can be directly delivered as an aerosol even if they have insufficient vapor pressure for the delivery of desired quantities of reactant in the gas phase.

Liquids for delivery in the aerosol include liquid solutions, neat liquids and dispersions. Liquid solutions can involve any reasonable solvent. Suitable solvents include water, but other solvents such as other inorganic solvents, alcohols, hydrocarbons, and other organic solvents can be used, if appropriate. A reactant, such as vanadium oxytrichloride, or a light (laser) absorbing compound, such as isopropyl alcohol, can serve as a solvent for additional reactants. If the solvent is a light absorbing compound, an additional light (laser) absorbing compound is not needed. Preferred compounds to be dissolved in the solution include, but are not limited to, metal compounds such as $MnCl_2$, $MnNO_3$, LiCl and $Li_2NO_3$. Metal compounds are useful for the production of metallic and ceramic nanoparticles.

The solution generally would have a concentration greater than about 0.5 molar. Higher concentrations lead to greater reactant throughput in the reaction chamber. Higher concentration solutions, however, can lead to liquids that are too viscous for convenient formation into an aerosol or that form aerosol droplets with undesirably large sizes or with a broad range of droplet sizes. Thus, solution concentration is another parameter to consider with respect to obtaining desired properties of the reaction product.

Suitable neat liquids include, for example, $VCl_3$, $VCl_4$, VCCl, $V(CO)_6$, $VOCl_3$, titanium tetrachloride ($TiCl_4$), titanium isopropoxide (or titanium isopropylate, $Ti[OCH(CH_3)_2]_4$), silicon tetrachloride ($SiCl_4$), trichlorosilane ($Cl_3HSi$), trichloromethyl silane $CH_3SiCl_3$, tetraethoxysilane ($Si(OC_2H_5)_4$, also known as ethyl silane and tetraethyl silane), $SnCl_4$, and liquid organometallic compounds such as $(C_4H_9)SnCl_3$ (n-butyl tin trichloride), $(CH_2CH)_2SnCl_2$ (divinyl tin dichloride), $(C_4H_9)_3SnCl$ (tri-n-butyl tin chloride) and aluminum s-butoxide ($Al(OC_4H_9)_3$). The liquid should have a suitable viscosity for delivery to the aerosol generator. The liquid can be heated to lower the viscosity to desired values.

The approaches described herein provide for the production of composite particles including multiple metals. Composites can be formed in a direct way by mixing compositions with different metals within the aerosol delivery apparatus. In particular, the aerosol delivery apparatus can be used to deliver a solution where two or more different metal compounds are dissolved into the solution or where two neat liquid metal compounds are mixed. The relative amounts of metal in the resulting particles can be adjusted by varying the relative amounts of metal in the aerosol, although the reaction may alter the relative amounts depending on the particular reactions involved.

Alternatively, a metal compound or compounds in the aerosol can be mixed in a variety of ways described below with one or more vapor metal reactants. Similarly, two different aerosols can be combined where each aerosol contains one or more metal compounds. Thus, the aerosol delivery approaches described herein provide extraordinarily versatile approaches to production of nanoparticles of composite (i.e., multiple) metal compounds.

Suitable dispersions include solid dispersions and dispersions of an immiscible liquid within another liquid, such as a colloidal suspension. For example, powders of aluminum chloride ($AlCl_3$), aluminum ethoxide ($Al(OC_2H_5)_3$), aluminum isopropoxide ($Al[OCH(CH_3)_2]_3$), manganese chloride ($MnCl_2$), hydrated manganese chloride ($MnCl_2.4H_2O$), and/or manganese nitrate ($Mn(NO_3)_2$) dispersed in selected organic solvents. Similarly, a powder of manganese carbonyl ($Mn_2(CO)_{10}$) can be dispersed in water. Generally, dispersions/slurries can be formed from a variety of metal oxides, other inorganic metal compounds, metals, organometallic compounds or organic compounds.

Approaches described herein provide for the production of highly uniform aerosols. These uniform aerosols are particularly useful for the production of particles in a laser pyrolysis apparatus. In a laser pyrolysis apparatus, a light absorbing material, possibly one or more of the reactants themselves or a solvent, rapidly transmit heat to the reactants. The reactants reach very high temperatures. Solvent, if any, is rapidly vaporized. The uniformity of the aerosol assists with the production of a more uniform product, for example, nanoparticles with a narrow size distribution.

Approaches are also described for the adaptation of aerosol delivery with a reaction chamber designed for commercial scale production by the elongation of the chamber in one dimension in the plane perpendicular to a reactant stream. The aerosol can be adapted for use with an elongated reaction chamber by a variety of approaches. Some of these approaches include, for example, using an elongated nozzle opening, placing columns of gas jets adjacent the aerosol nozzle, employing a plurality of aerosol nozzles and applying a combination thereof.

The materials used for the components described below preferably are durable and inert with respect to the various reactants. For most applications, stainless steel is a preferred material for the structural components. O-rings and the like can be produced from natural or synthetic rubber or other polymers. Other materials for specific applications are described below. For a particular application, the materials may be changed according to the requirements of the particular application based on the description herein.

Reaction Systems With Improved Aerosol Delivery

A reaction system with an aerosol delivery system is shown schematically in FIG. 1. Reaction system 90 includes a reaction chamber 92, collection apparatus 94 and aerosol delivery apparatus 96. Reaction chamber 92 can have a variety of designs and features. For example, the shape of reaction chamber 92 may be influenced by the type of reaction to take place in the reaction chamber. For the performance of laser pyrolysis, the reaction chamber has a light beam, generally a laser beam, path intersecting with a reactant stream that includes an aerosol and possibly other reactants.

Figure 2:
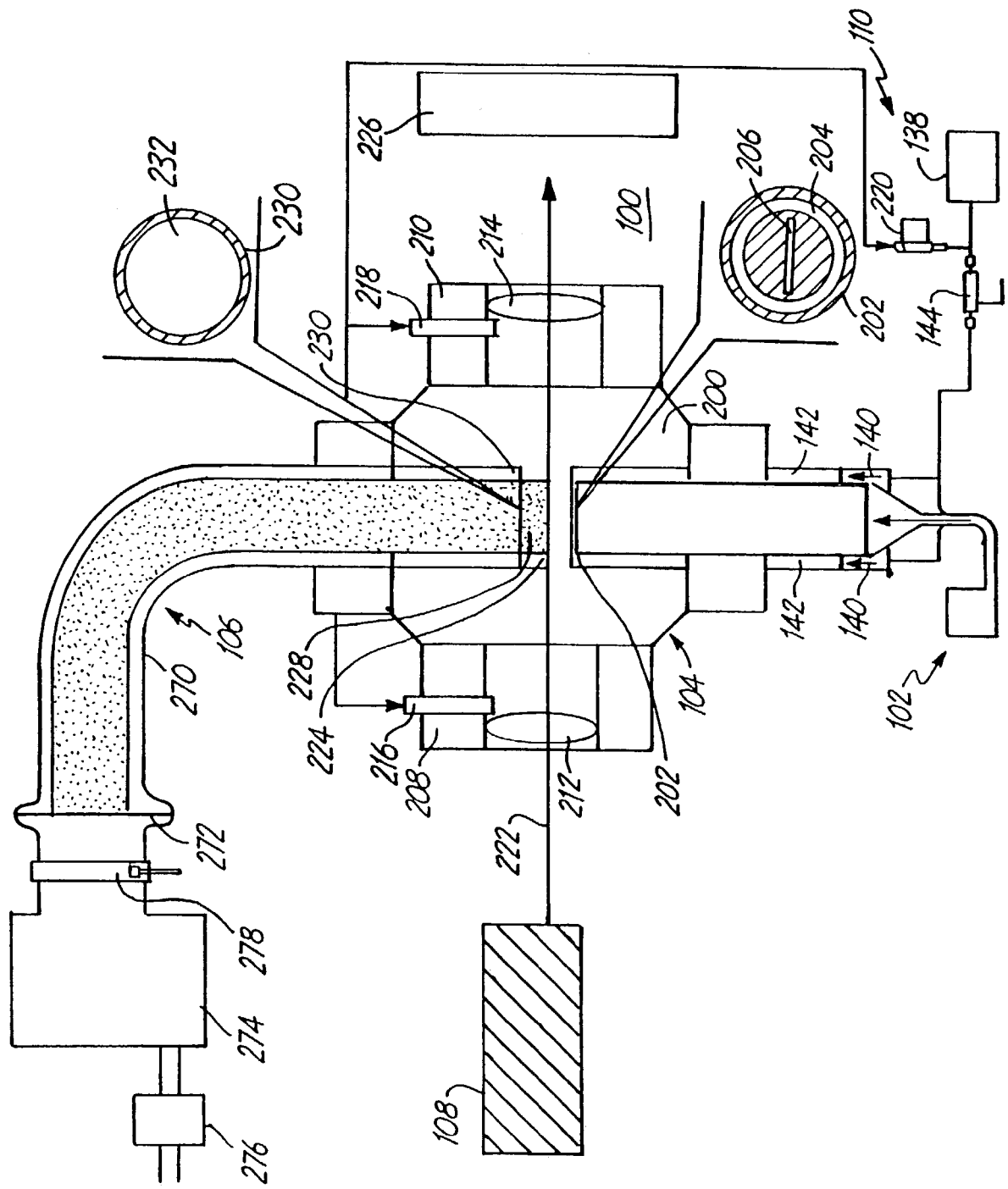

One embodiment of a laser pyrolysis apparatus 100 is shown in FIG. 2. Laser pyrolysis apparatus 100 involves a aerosol reactant delivery apparatus 102, reaction chamber 104, collection system 106, light source 108, such as a laser, and shielding gas delivery system 110.

Shielding gas delivery system 110 includes inert gas source 138 that is connected to an inert gas duct 140. Inert gas duct 140 flows into annular channel 142. A mass flow controller 144 preferably regulates the flow of inert gas into inert gas duct 140. Suitable mass flow controllers include, for example, Edwards Mass Flow Controller, Model 825 series, from Edwards High Vacuum International, Wilmington, Mass.

The reaction chamber 104 includes a main chamber 200. Reactant supply system 102 connects to the main chamber 200 at injection nozzle 202. The end of injection nozzle 202 has an annular opening 204 for the passage of inert shielding gas, and a reactant opening 206 for the passage of reactants to form a reactant stream in the reaction chamber. The end of injection nozzle 202 is shown in the lower insert of FIG. 2. Annular opening 204 has, for example, a diameter of about 1.5 inches and a width along the radial direction from about 1/8 in to about 1/16 in. The flow of shielding gas through annular opening 204 helps to prevent the spread of the reactant gases and product particles throughout reaction chamber 104. Reactant opening 206 can be circular or rectangular. An aerosol generator or an inlet for delivery of an aerosol and, optionally, gases are directed through reactant opening 206. Additional description of elongated (such as rectangular) injection nozzle openings are described in the following section.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length approximately equal to the distance between the center of the chamber to the surface of the lens to focus the beam at a point just above the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants and/or products. In one embodiment, window 212, 214 are displaced about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Light source 108 is aligned to generate a light beam 222 that enters window 212 and exits window 214. Windows 212, 214 define a light path through main chamber 200 intersecting the flow of reactants at reaction zone 224. After exiting window 214, light beam 222 strikes power meter 226, which also acts as a beam dump. An appropriate power meter is available from Coherent Inc., Santa Clara, Calif. Light source 108 can be an intense conventional light source such as an arc lamp. Preferably, light source 108 is an infrared laser, especially a CW $CO_2$ laser such as an 1800 watt maximum power output laser available from PRC Corp., Landing, N.J.

Reactants passing through opening 206 in injection nozzle 202 initiate a reactant stream. The reactant stream passes through reaction zone 224, where a chemical reaction takes place. Heating of the gases in reaction zone 224 can be extremely rapid, roughly on the order of $10^5$ degree C./sec depending on the specific conditions. The reaction is rapidly quenched upon leaving reaction zone 224, and particles 228 or other products are formed in the reactant stream. The nonequilibrium nature of the laser pyrolysis process allows for the production of nanoparticles with a highly uniform size distribution and structural homogeneity.

The path of the reactant stream continues to collection nozzle 230. In this embodiment, collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. The end of collection nozzle 230 is shown in the upper insert of FIG. 2. Circular opening 232 feeds into collection system 106. The chamber pressure can be monitored with a pressure gauge attached to the main chamber.

Reaction chamber 104 has two additional tubular sections not shown. One of the additional tubular sections projects into the plane of the sectional view in FIG. 2, and the second additional tubular section projects out of the plane of the sectional view in FIG. 2. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of reaction products.

The apparatus preferably is controlled by a computer. Generally, the computer controls the light source and monitors the pressure in the reaction chamber. The computer can be used to control the flow of reactants and/or the shielding gas.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the top of the reaction chamber, and the product particles are collected from the bottom of the chamber.

Referring to FIG. 1, collection apparatus 94 includes a conduit 250 connected to the outlet of reaction chamber 92, a separation device 252 and a vent 254. Conduit 250 may or may not be curved, depending on the configuration of reaction system 90 and the nature of the products. Generally, collection apparatus 94 includes a pump or the like to establish a flow from the reaction chamber 92 through the separation device 252 although positive pressure in the reaction chamber, if present, can maintain this flow without a pump in collection apparatus 94. Collection apparatus 94 optionally includes a scrubber to remove any unreacted materials from the flow stream prior to passage from vent 254 into the atmosphere.

The characteristics of separation device 252 generally depend on the nature of the reaction products. Also, separation device 252 can be designed to operate in a batch mode in which the reaction system is shut off to harvest the product, or a continuous mode in which product is harvested without shutting off the reaction system. For particulate products, separation device 252 for batch operation can be simply a filter located in the flow from reaction chamber 92 to vent 254.

An embodiment of a separation device for the collection of nanoscale particles in batch mode is depicted in FIG. 2. Collection system 106 includes a curved channel 270 leading from collection nozzle 230. With small product particles, the product particles follow the flow of the gas around curves. Collection system 106 includes a filter 272 within the gas flow to collect the product particles. A variety of materials such as Teflon®, glass fibers and the like can be used for the filter as long as the material is inert and has a fine enough mesh to trap most of the particles. Preferred filters include, for example, a glass fiber filter from ACE Glass Inc., Vineland, N.J. and a cylindrical polypropylene filter from Cole-Parmer Instrument Co., Vernon Hills, Ill.

Pump 274 is used to maintain collection system 106 at a selected pressure. A variety of different pumps can be used. Appropriate pumps for use as pump 274 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 276 to remove any remaining reactive chemicals before venting into the atmosphere. Apparatus 100 or a portion thereof can be placed in a fume hood for ventilation purposes and for safety considerations.

The pumping rate can be controlled by a valve 278, such as a manual needle valve or an automatic throttle valve, inserted between pump 274 and filter 272. As the chamber pressure increases due to the accumulation of particles on filter 272, valve 278 can be adjusted to maintain the pumping rate and the corresponding chamber pressure.

The reaction can be continued until sufficient particles are collected on filter 272 such that pump 274 can no longer maintain the desired pressure in reaction chamber 104 against the resistance through filter 272. When the pressure in reaction chamber 104 can no longer be maintained at the desired value, the reaction is stopped, and the filter 272 is removed. With this embodiment, up to about 100 grams of particles can be collected in a single run before the chamber pressure can no longer be maintained. A single run generally can last up to about 10 hours depending on the type of particle being produced and the type of filter being used.

In comparison, an embodiment of a collection apparatus for continuous operation includes a plurality of filters that act as phase discriminators by passing gas phase effluent but trapping most of the non-gas phase material. At selected time intervals, forces are applied to one or more filters to dislodge the product associated with those filters. In preferred embodiments, a back pressure pulse is applied to supply the dislodging force. The dislodged particles fall by way of gravity, with some initial assistance from flow currents with certain chamber designs, to a particle outlet where the particles are collected.

The filters can be pulsed sequentially to maintain good flow through the collection apparatus without large fluctuations in pressure at the inlet into the collection apparatus. The particles can be collected in a container, or the particles can be conveyed to a location for additional processing. This preferred collection system is described further in copending and commonly assigned U.S. patent application Ser. No. 09/107,729, now U.S. Pat. No. 6,270,732 to Gardner et al., entitled "Particle Collection Apparatus and Associated Methods," incorporated herein by reference.

The design of aerosol delivery apparatus 106 can be based on a variety of principles that provide for the formation of an aerosol. In particular, the aerosol can be produced with an ultrasonic nozzle, with an electrostatic spray system, with a pressure-flow or simplex atomizer, with an effervescent atomizer or with a gas atomizer where liquid is forced under significant pressure through a small orifice and fractured into particles by a colliding gas stream. A variety of configurations, discussed further below, can be used with all of the approaches.

Regardless of the principle behind the aerosol production, aerosol delivery apparatus 96 can produce the aerosol at or near an opening into the reaction chamber 92, along a side channel where the aerosol is drawn into a separate gas flow that leads into the reaction chamber 92, within an aerosol chamber connected to a channel leading into reaction chamber 92, or simply within a channel leading into reaction chamber 92. Referring to FIG. 3, an embodiment of an aerosol delivery apparatus 300 is shown that directs the aerosol directly into reaction chamber 92. An aerosol generator 302 is supported by mount 304.

Referring to FIGS. 3 and 4, mount 304 has a generally cylindrical shape. Mount 304 includes a lip 306 extending within cylindrical cavity 308. Lip 306 helps support aerosol generator 302. In this embodiment, lip 306 includes a notch, which allows a portion of aerosol generator 302 to extend past lip 306. Top surface of mount 304 includes a hollow 314 for holding an o-ring or the like to form a seal with cap 316 or a spacer, described below. Mount 304 further includes threads 318 on the outer surface 320.

Referring to FIGS. 3, 5 and 6, cap 316 attaches over the top of mount 304. Cap 316 includes threads 328 that are mated with threads 318 on mount 304. Flange 330 can be used to form a seal with an o-ring or the like. Surface 332 includes hollow 334. Hollow 334 can hold an o-ring or the like to form a seal with aerosol generator 302 or a shim, described further below.

Tube 336 is in fluid communication with cavity 338. Tube 336 provides for gas flow into cavity 338. Cavity 338 vents through port 340. Tubes 342 provide for fluid flow through channels 344 into projecting tubes 346. In this embodiment, four projecting tubes 346 project toward the flow stream coming from aerosol generator 302 and port 340. Four projecting tubes 346 are symmetrically distributed around port 340. More or less than four projecting tubes 346 can be used, if desired. The use of projecting tubes 346 are particularly useful to mix reactants further within the reaction chamber away from aerosol generator 302. Such mixing further in the reaction chamber can be useful particularly if the reaction is highly exothermic. Using projecting tubes 346, gases such as reactant gases and/or radiation absorbing gases can be mixed within reaction chamber 92 with reactants from aerosol generator 302 and/or port 340.

The position of aerosol generator 302 relative to port 340 can affect significantly the properties of the resulting reactant stream and thereby the properties of the reaction product. With an ultrasonic aerosol generator, the tip of the aerosol generator preferably is located between positions just slightly below the cap surface to just slightly above the cap surface. If the aerosol generator is significantly below the cap surface, the cap blocks a portion of the aerosol. Spacer 350, shown in FIG. 7 can be placed between cap 316 and mount 304 to change the position of aerosol generator 302 relative to port 340. Spacer 350 is a cylindrical piece with a hollow 352 along top surface 354 for holding an o-ring or the like. Top surface 354 seals against flange 330. Lower surface 356 of spacer 350 seals against top surface 312 of mount 304. A shim 358 as shown in FIG. 8 is correspondingly placed between cap 316 and aerosol generator 302. Top surface 360 of shim 358 engages the o-ring in hollow 334. Flange 362 engages the aerosol generator 302.

Figure 3:
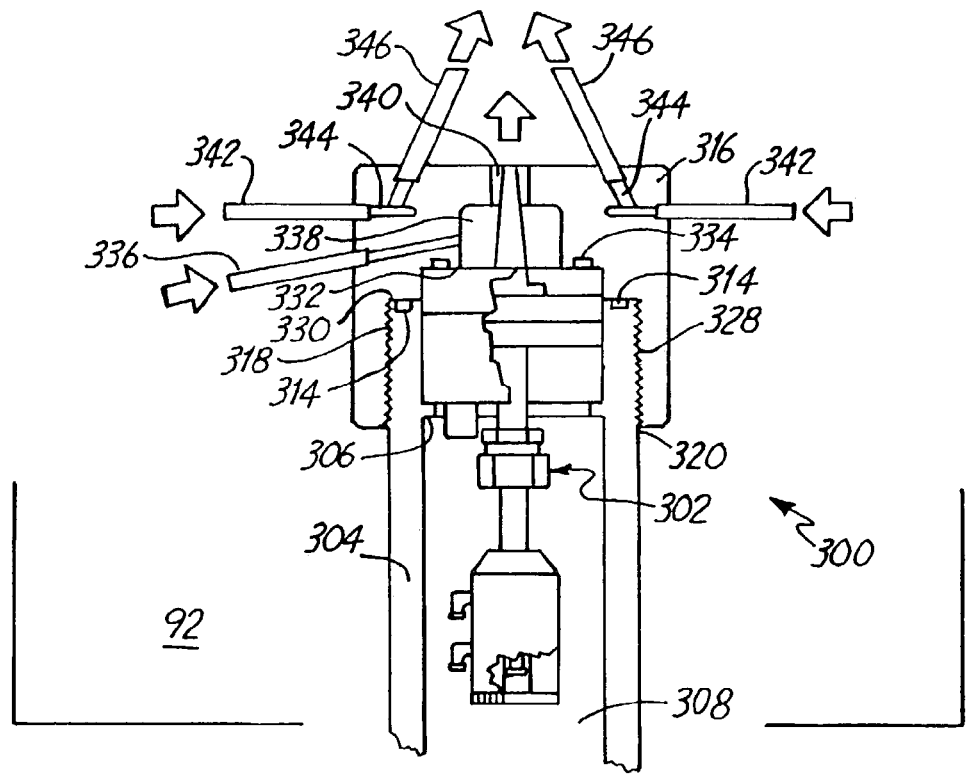

Referring to FIG. 3, the flow of reactants into reaction chamber 92 can be affected by the placement of a cap bushing at the opening of port 340. More specifically, a cap bushing can help provide a more confined reactant stream within reaction chamber 92. Three embodiments of cap bushings 370–374 are shown in FIGS. 9–11, respectively. Referring to FIG. 9, cap bushing 370 has a cylindrical passage 376 and a flat upper surface 378 generally perpendicular to the central axis of cylindrical passage 376. Referring to FIG. 10, cap bushing 372 has a conical passage 380 and a flat upper surface 382 generally perpendicular to the symmetry axis of conical passage 380. Referring to FIG. 11, cap bushing 374 has a conical passage 384 and a top surface with a flat section 386 and a conical section 388. Preferred embodiments of cap bushings have a sharp edge between the internal passage and the top surface.

In use, aerosol generator 302 produces an aerosol from a liquid supplied to aerosol generator 302. Depending on the design of aerosol generator 302, aerosol generator 302 can deliver a gas along with the aerosol. Also, the aerosol can be combined with a gas supplied through tube 336. Thus, the aerosol and any gases supplied from aerosol generator 302 and/or tube 336 are directed into reaction chamber 92 near the opening of cap 316. The aerosol and any gases emanating from aerosol generator 302 and/or tube 336 can be combined further within reaction chamber 92 with additional gases from projecting tubes 346. The resulting mixture of aerosol and gases is subsequently reacted within reaction chamber 92.

For the performance of laser pyrolysis based reaction synthesis, the aerosol generally is mixed with one or more additional reactant gases, a light absorbing gas if the reactants and the solvent do not sufficiently absorb the laser radiation, and/or an inert gas. The gases can be supplied from a solid precursor delivery system where the solid is sublimed, a liquid precursor delivery system where vapor is withdrawn from a liquid supply, a pressurized cylinder, other suitable containers or a combination thereof. A carrier gas can be used with the delivery of vapors from a solid or liquid source. Multiple reactants can be mixed in the liquid phase and delivered as the aerosol. Similarly, multiple aerosols can be generated, if desired, to form the reactant stream.

As noted above, aerosol delivery apparatus 96 can generate the aerosol along a side channel where the aerosol is drawn into a separate gas flow that leads into the reaction chamber 92. This configuration can be used effectively to produce an aerosol with a highly uniform size of droplets/particulates since heavier droplets/particulates tend to settle out due to gravity. Any aerosol that settles out as a liquid generally flows to a collection point for reuse.

Figure 12A:
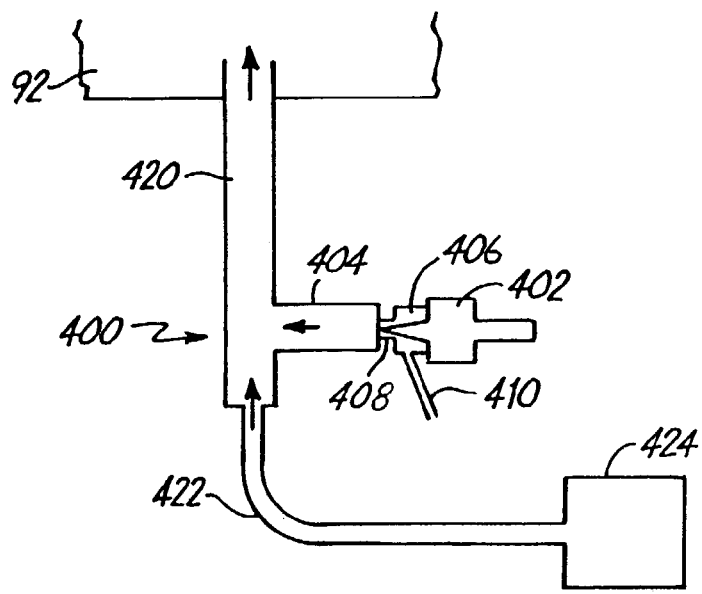
FIG. 12A is a schematic, sectional view of an alternative embodiment of an aerosol delivery apparatus connected to a reaction chamber with the aerosol generated in a conduit leading to a carrier gas flow, where the cross section is taken through the center of the aerosol delivery apparatus.

An embodiment of an aerosol delivery apparatus 400 that generates an aerosol along a side channel is shown in FIG. 12A. Aerosol generator 402 directs an aerosol into tubular section 404. The relative position of aerosol generator 402 and tubular section 404 can be varied to produce a reactant stream with desired properties. Optionally, a chamber 406 is placed in fluid communication with a port 408 that connects chamber 406 with tubular section 404. In this embodiment, an inlet 410 is in fluid communication with chamber 406 such that gas can be directed through port 408 into tubular section 404 by way of inlet 410 and chamber 406.

Tubular section 404 is in fluid communication with delivery tube 420. Delivery tube 420 is connected to supply tube 422, which is in turn connected to gas supply 424. Gas supply 424 can be a solid precursor delivery system where the solid is sublimed, a liquid precursor delivery system where vapor is withdrawn from a liquid supply, a pressurized cylinder, other suitable containers or a combination thereof. Thus, the aerosol generated within tubular section 404 flows to delivery tube 420 where gases flowing from supply tube 422 carry the aerosol through delivery tube 420 into reaction chamber 92. If a liquid solution is used to create the aerosol, the solvent can evaporate in delivery tube 420 such that the aerosol contains solid particles of the solute flowing in the gas stream.

Figure 12B:
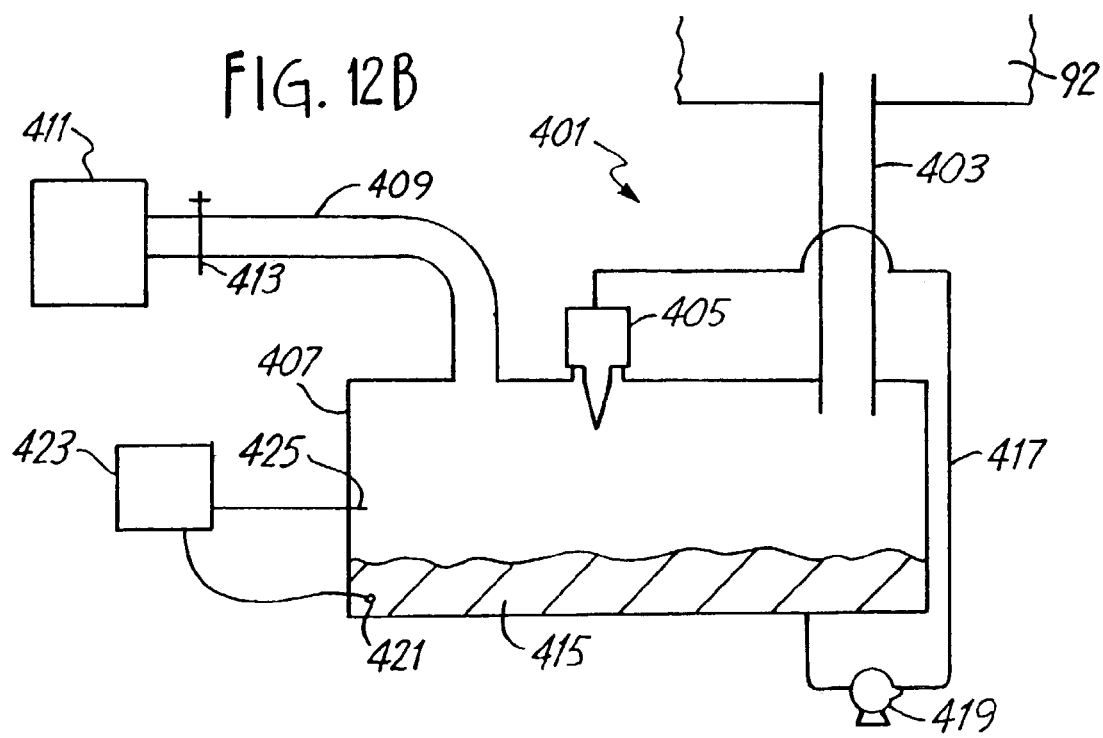
FIG. 12B is a schematic, sectional view of an alternative embodiment of an aerosol delivery apparatus connected to a reaction chamber with the aerosol generated in an aerosol chamber, where the cross section is taken through the center of the aerosol delivery apparatus.

An alternative embodiment of an aerosol delivery apparatus 401 that generates an aerosol away from reactant delivery tube 403 is shown in FIG. 12B. Aerosol generator 405 produces an aerosol within aerosol chamber 407. Aerosol chamber 407 is in fluid communication with reactant delivery tube 403, which is in fluid communication with reaction chamber 92. Aerosol chamber 407 is also in fluid communication with gas delivery channel 409. Gas delivery channel 409 is connected to gas supply 411. Flow of carrier gas to gas delivery channel 409 from gas supply 411 preferably is controlled by one or more valves 413. Gas supply 411 can include a variety of gas/vapor sources, as described above.

Aerosol chamber 407 generally holds a supply of liquid 415 for aerosol delivery. Liquid 415 can be directed to aerosol generator 405 through tube 417 with pump 419. In preferred embodiments, a sensor 421 detects depletion of liquid and/or change in concentration of reactant, such that additional solvent and/or solution can be added from liquid supply 423 through inlet 425 to maintain liquid 415 within desired parameters.

The aerosol produced by aerosol generator 405 disperses within aerosol chamber 407. Heavier droplets settle into liquid 415. Lighter droplets are carried by gas from gas delivery channel 409 into reactant delivery tube 403 and then into reaction chamber 92. In this way the velocity of the aerosol can be set using the gas flow rate. The gas can be an inert gas, a reactant gas, a light absorbing gas or a mixture thereof. Due to evaporation of solvent from the aerosol droplets that fall back into liquid 415, the liquid gradually becomes more concentrated. Sensor 421 can be used to control replacement of solvent, such that the concentration of the solution does not deviate beyond an acceptable range. Inlet 425 can also be used to replenish liquid 415 as it is consumed, to provide for continuous operation of the reaction chamber.

Figure 13:
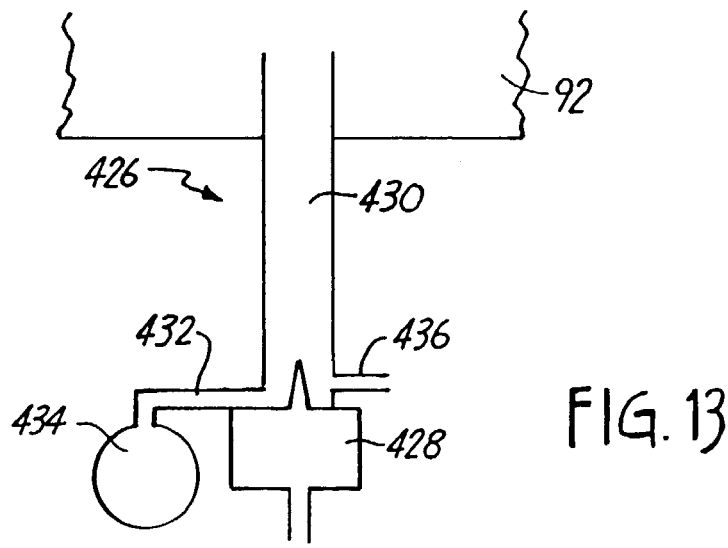
FIG. 13 is a schematic, sectional view of another alternative embodiment of an aerosol delivery apparatus connected to a reaction chamber, where the cross section is taken through the center of the aerosol delivery apparatus.

Furthermore, aerosol delivery apparatus 96 can generate the aerosol within a channel that leads directly to reaction chamber 92. This is a variation on the embodiment in FIG. 12A where tubular section 404 is removed or shortened to a negligible length. This embodiment of aerosol delivery apparatus 426 is shown in FIG. 13. Aerosol generator 428 produces an aerosol within delivery tube 430 that leads to reaction chamber 92.

The aerosol generator can be placed at various orientations within delivery tube 430 to produce the desired reactant characteristics within reaction chamber 92. For example, if aerosol generator 428 is pointing along delivery tube 430, as shown in FIG. 13, the edges of the aerosol may collide with the walls of delivery tube 430 possibly to coalesce or to fragment into smaller particles. If aerosol generator 428 is at an angle with respect to delivery tube 430, the aerosol would be directed at the walls such that larger, less buoyant droplets would tend to hit the wall with relatively high frequency. Aerosol that coalesces prior to reaching reaction chamber 92 flows back down delivery tube 430. The coalesced aerosol flows through collection tube 432 into reservoir 434. Gas can be added to the flow along delivery tube 430 by way of gas inlet 436.

In a particularly preferred variation, a carrier gas is introduced along a relatively long delivery tube 430. A delivery tube longer than about 20 diameters results in laminar flow of carrier gas. The aerosol is introduced at an angle less than or equal to 90 degrees relative to the center axis of delivery tube 430. The aerosol is delivered with the carrier gas from delivery tube 430 such that the spray is introduced obliquely, and there is a boundary layer along the inner surface of delivery tube 430. The opening of the delivery tube can be elongated along a selected direction.

Aerosol delivery apparatus 96 includes an aerosol generator placed in a selected configuration, examples of which were discussed above. For example, in the specific embodiments of the aerosol delivery apparatus 300 (FIG. 3), 400 (FIG. 12A), 401 (FIG. 12B) and 426 (FIG. 13), the aerosol generators are 302, 402, 405 and 428, respectively. As noted above, the aerosol generator can be based on an ultrasonic nozzle, an electrostatic spray system, a pressure-flow atomizer, an effervescent atomizer or a gas atomizer.

Figures 14, 15, 16, 17:
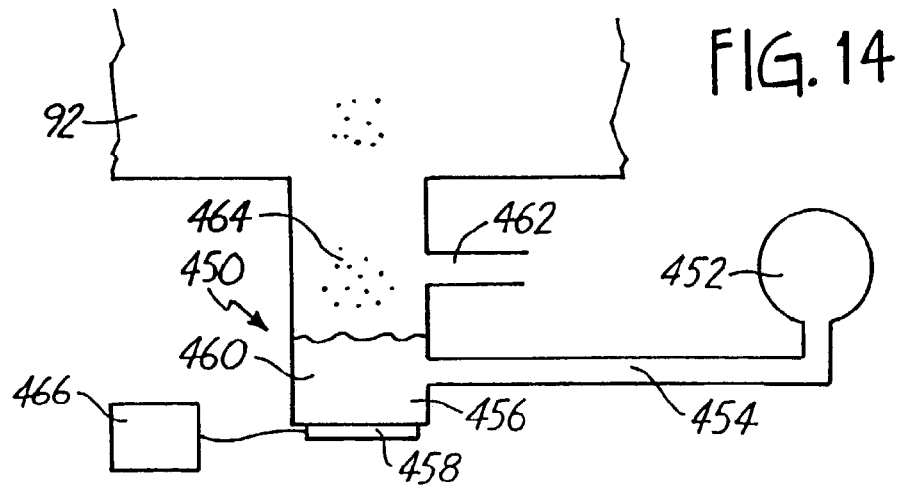
FIG. 14 is a schematic, sectional view of an embodiment of an ultrasonic aerosol generator connected to a reaction chamber, where the cross section is taken through the center of the apparatus.
FIG. 15 is a side view of an alternative embodiment of an ultrasonic aerosol generator.
FIG. 16 is a sectional, side view of the ultrasonic aerosol generator of FIG. 15, where the cross section is taken through the center of the apparatus.
FIG. 17 is a schematic, side view of the ultrasonic generator of FIG. 15 connected to a liquid supply apparatus.

A first embodiment of an aerosol generator 450 is shown in FIG. 14. Liquid is delivered by way of a liquid source 452 and a liquid delivery tube 454 to vessel 456. Ultrasonic transducer 458 is located at or near the bottom of vessel 456. A pool of liquid 460 is located above ultrasonic transducer 458. Tube 462 can be used to deliver a carrier gas to facilitate the flow of aerosol 464 into reaction chamber 92. Aerosol 464 is produced from pool of liquid 460 by vibration of ultrasonic transducer 458. Ultrasonic transducer 458 is driven by ultrasonic generator 466.

Other constraints can be placed in the flow pattern between vessel 456 and reaction chamber 92. For example, a delivery tube with a smaller diameter than vessel 456 can be used to deliver the aerosol, where the vessel is sealed against the delivery tube. The delivery tube preferably would extend near the surface of pool of liquid 460 and past the inlet from tube 462 such that flow of gas from tube 462 into the delivery tube would tend to direct the aerosol into the delivery tube. A comparable aerosol generator used with a laser pyrolysis apparatus is described in M. Cauchetier et al., "Nanocomposite Si/C/N Powder Production by Laser-Aerosol Interaction," J. American Ceramic Society 77(4) 993–998 (1994), incorporated herein by reference.

A preferred aerosol generator includes an ultrasonic transducer and atomization surface with a hole through which a liquid flows. The atomization surface is operably connected with the ultrasonic transducer such that vibrations induced by the ultrasonic transducer form an aerosol from the liquid on the atomization surface. Ultrasonic nozzles with an atomization surface generally produce highly uniform aerosols that are especially useful for the production by laser pyrolysis of particles with a very narrow particle size distribution.

An embodiment of a preferred ultrasonic nozzle 500 is depicted in FIGS. 15–16. Ultrasonic nozzle 500 includes a nozzle tip 502, a nozzle body 504, a connector 506 for connection to an ultrasonic generator, and a liquid connection 508 for connection to a liquid reservoir. An atomization surface 510 is located at the end of nozzle tip 502. The size and shape of atomization surface 510 can be varied to yield a desirable spacial distribution of aerosol particles.

Nozzle tip 502 is connected to nozzle body 504 at or near top surface 512. Ultrasonic transducer 514 is located within nozzle body 504 at a suitable position to vibrate nozzle tip 502. Generally, ultrasonic transducer 514 is located toward top surface 512. Preferred ultrasonic transducers include, for example, piezoelectric transducers. Preferably, ultrasonic transducer 514 includes two or more piezoelectric transducers 516 coupled to oscillate in phase such that the amplitudes of the two vibrating piezoelectric transducers add to create an additive force at atomizing surface 510. In particular, greater than two piezoelectric transducers can be used to extend the range of solute concentrations while maintaining efficient atomization.

Ultrasonic transducer 514 is connected to an ultrasonic generator by way of connector 506. The ultrasonic generator preferably is a broad band generator operating over a frequency range from about 20 kHz to about 120 kHz. Higher frequencies generally are preferred since they result in smaller aerosol droplets. The electrical signal from the ultrasonic generator is conveyed from connector 506 to ultrasonic transducer 514 by way of conductors 518. Liquid flows from liquid connection 508 to atomization surface 510 through channel 520, which runs through nozzle body 504. Ultrasonic nozzles with atomization surfaces and suitable broadband ultrasonic generators are available from Sono-Tek Corporation, Milton, N.Y., such as model 8700-120.

Liquid is supplied to liquid connection 508 using a liquid supply apparatus 540, shown schematically in FIG. 17. Liquid supply apparatus 540 includes, at least, one liquid reservoir 542 and a tube 544. Tube 544 is connected directly or indirectly to liquid connection 508. Similarly, tube 544 is connected directly or indirectly to liquid reservoir 542. Liquid supply apparatus 540 generally includes a means for forcing the liquid through tube 544 under pressure. Proper placement of liquid reservoir 542 can result in gravity supplying the pressure. In other embodiments, mechanical means are used to supply a relatively constant amount of pressure within tube 544. For example, a pump 546 can be connected to tube 544. Suitable pumps include, for example, syringe pumps and centrifical pumps. In one embodiment, multiple, syringe pumps are used such that a second pump can maintain a relatively constant pump rate when one pump must stop to refill the syringe. Alternatively, reservoir 542 can be attached to a gas source 548 that supplies pressurized gas into reservoir 542 to force liquid out of reservoir 542 under pressure.

Multiple reservoirs 542 can be used, if desired. If multiple reservoirs 542 are used, they can hold different liquids for simultaneous or sequential delivery, or they can hold the same liquid for simultaneous or sequential delivery. Continuous production can be maintained by switching to a separate reservoir while an empty reservoir is replaced. The reservoirs generally can be made as large as convenient.

Figure 18:
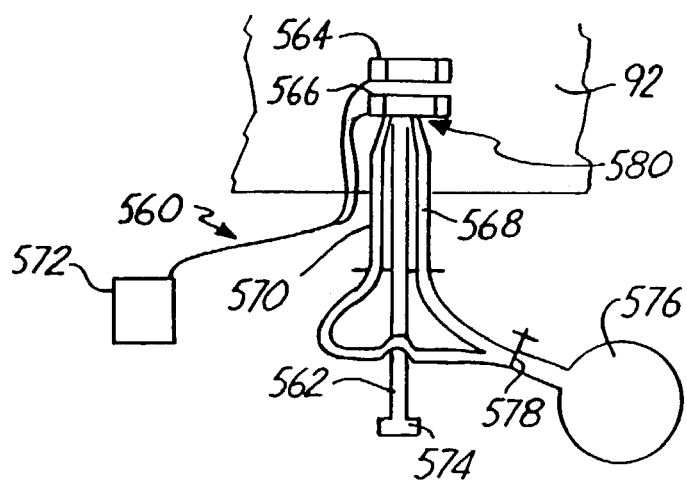
FIG. 18 is a schematic, side view of an electrostatic, aerosol generator, where the cross section is taken through the center of the apparatus.

An alternative embodiment of an aerosol generator 560 based on electrostatic fields is shown in FIG. 18. Aerosol generator 560 comprises a liquid delivery tube 562, electrodes 564, 566, and gas supply conduits 568, 570. As shown in FIG. 18, electrodes 564, 566 are placed within reaction chamber 92 to generate the aerosol directly within reaction chamber 92. As noted above the aerosol generator can be placed in other locations relative to reaction chamber 92.

Electrodes 564, 566 produce a very large electric field just beyond the opening of liquid delivery tube 562 and gas supply conduits 568, 570. Thus, the liquid-gas mixture that forms is subjected to these very large electric fields. Electrodes 564, 566 are connected to an electrical supply 572. Generally, greater than 1 kilovolt is placed on the electrodes.

Liquid delivery tube 562 is connected at liquid connector 574 to a liquid supply apparatus such as the one shown in FIG. 17, described above. Gas supply conduits 568, 570 are connected to a gas supply 576, which can be a gas cylinder or cylinders or the like, with one or more valves 578 controlling the flow from gas supply 576 to gas supply conduit 568.

The gas and liquid mix at nozzle tip 580. The liquid component has a charge on its surface such that the liquid passing electrodes 564, 566 is subjected to forces greater than the surface tension. The electric field shatters the liquid into small, liquid droplets that are carried by the flow into reaction chamber 92. Lower liquid pressures can be used relative to corresponding gas atomization aerosol generators. For laser pyrolysis embodiments, the gas can be an inert gas, a reactant gas, a radiation absorbing gas for initiation of the reaction, or mixtures thereof. Electrostatic spray systems are available from, for example, Electrostatic Spraying Systems, Inc., Watkinsville, Ga.

Figure 19:
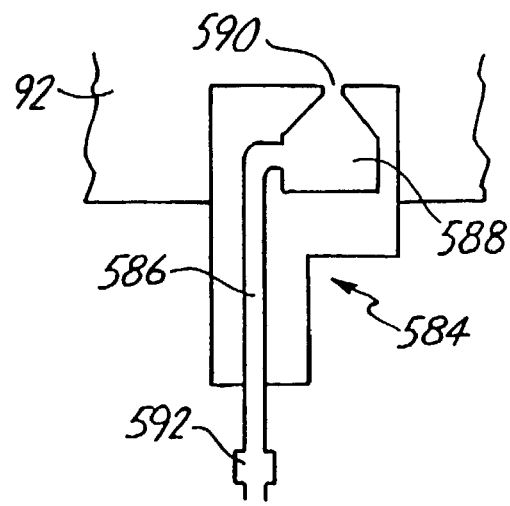
FIG. 19 is a schematic, sectional side view of an aerosol generator with a simplex atomizer, where the cross section is taken through the center of the apparatus.

An embodiment of an aerosol generator 584 with a simplex atomizer is depicted in FIG. 19. Delivery tube 586 opens into a vortex or swirl chamber 588. A small orifice 590 is located at an end of swirl chamber 588 at an angle to the opening of delivery tube 586. Orifice 590 opens within reaction chamber 92. Delivery tube 586 connects at fluid connection 592 to a liquid supply apparatus, such as liquid supply apparatus 540 shown schematically in FIG. 17, discussed above. The liquid supply apparatus supplies liquid under pressure into delivery tube 586. The position of orifice 590 within reaction chamber 92 can be varied to produce desired reaction conditions. A simplex atomizer can be constructed without the swirl chamber, where the shape of the orifice and external surfaces spread out the fluid as desired. Examples of atomization nozzles using external surfaces to form and shape the aerosol include the Fan (FF) nozzle and the Impingement (PT) nozzle distributed by BETE Fog Nozzle, Inc., Greenfield, Mass.

An embodiment of an aerosol generator 594 with a spill-return atomizer is shown in FIG. 20. The spill-return atomizer is very similar to the simplex atomizer with the addition of a spill-return 596 at the rear wall of swirl chamber 598. Spill return 596 connects with a container 600. Spill return 596 collects any liquid that is not delivered as an aerosol. Delivery tube 602 opens in the wall of swirl chamber 598. Delivery tube 602 connects with a fluid supply apparatus at fluid connection 604.

Referring to FIGS. 21A–C, aerosol generator 608 includes a two-fluid internal-mix atomizer. A gas supply tube 612 open into cylindrical passage 614. Cylindrical passage 614 opens through ports 616 into ring shaped conduit 609 connecting to channels 618, which lead to mixing chamber 620. A small orifice 622 is located within reaction chamber 92 at the front of mixing chamber 620. A liquid delivery tube 611 opens at a plurality of openings 613 into channel 618. Liquid delivery tube 611 connects at fluid connection 615 to a liquid supply apparatus. The liquid supply apparatus supplies liquid into liquid delivery tube 611.

Gas supply tube 612 connects to a gas supply 617 through a valve 619. Gas supply 617 can be any gas or vapor source, as described above. The gas and liquid mix prior to injection as an aerosol from orifice 622. The position of orifice 622 within reaction chamber 92 can be varied to produce desired reaction conditions. With low gas flow, an effervescent atomizer is obtained if explosive decompression of the atomizing gas is obtained at the nozzle orifice. In an effervescent atomizer, the gas is dispersed within the liquid phase within the mixing chamber.

Referring to FIG. 22, aerosol generator 626 can be referred to as a two-fluid external-mix atomizer. A liquid delivery tube 628 is in fluid communication with swirl chamber 630. A small orifice 632 is located at the front of swirl chamber 630 and opens into reaction chamber 92. Liquid delivery tube 628 connects at fluid connection 634 to a liquid supply apparatus. The liquid supply apparatus supplies liquid into liquid delivery tube 628. A gas supply tube 636 connects with passage 638 that opens just beyond orifice 632. Gas supply tube 636 connects to a gas supply 640 through a valve 642. The gas and liquid mix just beyond orifice 632 as the aerosol enters reaction chamber 92. Contact of gas with the liquid exiting orifice 632 further breaks up the liquid stream into fine droplets.

Referring to FIG. 23, an embodiment of an aerosol generator 601 with an gas-blast atomizer is depicted. A gas-blast atomizer is a variation on a two-fluid external-mix atomizer. Aerosol generator 601 is generally cylindrically symmetric except for the fluid delivery tubes. A liquid delivery tube 603 is in fluid communication with a chamber 605. Chamber 605 opens at a small orifice 607 that connects to passage 609. Liquid delivery tube 603 connects at fluid connection 611 to a liquid supply apparatus. The liquid supply apparatus supplies liquid into liquid delivery tube 603. A gas supply tube 613 connects with passage 609 that opens into reaction chamber 92. Gas supply tube 613 further connects with secondary passage 615. Secondary passage 615 opens near the opening of passage 609. Gas supply tube 613 connects to a gas supply 617 through a valve 619.

Liquid flowing through orifice 607 flows on surface 621. The liquid forms a thin sheet on surface 621 generally thinning near the opening of passage 609. At the edge of surface 621, the sheet of liquid coming off of surface 621 is sheared between the flows of gases from passage 609 and secondary passage 615 to form an aerosol within reaction chamber 92. Small drop sizes can be obtained with the air-blast atomizer due to physical contact between the liquid and gas contacting the liquid from both sides of the liquid.

Furthermore, while aerosol delivery apparatuses 560, 584, 594, 608, 626 and 601 are shown as producing an aerosol directly within reaction chamber 92 other configurations of these aerosol generators and reaction chamber 92 can be used, as described above.

Another embodiment of an aerosol generator 633 based on gas atomization is shown schematically in FIG. 24. Gas from gas supply 623 flows through a venturi 625 connected to a liquid supply 627. Suction associated with the venturi sucks liquid into the gas stream. The expansion of the liquid-gas mixture into delivery tube 629 produces an aerosol. The aerosol flows through delivery tube 629 to reaction chamber 92. Aerosol that condensed back into liquid is collected in reservoir 631. The configuration of aerosol generator 621 and reaction chamber 92 can be changed as desired. Venturi based aerosol nozzles are available from TSI Corn., Saint Paul, Minn.

An apparatus with a reaction chamber similar to that shown in FIG. 2 and an aerosol reactant delivery apparatus was used to produce manganese oxide nanoparticles by laser pyrolysis. The apparatus was successfully used with several different aerosol delivery apparatuses including apparatuses similar to those shown in FIGS. 12A–B, 13, and 24 and with an ultrasonic aerosol generator such as shown in FIGS. 15 and 16, and a two fluid external-mix atomizer. The collection apparatus was similar to the collection apparatus of FIG. 2. The production of manganese oxides using this apparatus and an aerosol generator similar to FIG. 24 is described in more detail in commonly assigned and simultaneously filed U.S. patent application Ser. No. 09/188,770, now U.S. Pat. No. 6,506,493 entitled "Metal Oxide Particles," to Kumar et al., incorporated herein by reference.

For the performance of laser pyrolysis, the properties of the aerosol effect the conditions of the particle synthesis. Five parameters that enter into the pyrolysis conditions are droplet size, reactant velocity, laser beam size, reactant density and inert gas concentration in the reactant stream. First, the aerosol droplets must be vaporized by the laser beam such that the reactants can properly mix and react. In this respect, smaller droplets are preferred. The velocity of the reactants also effect the vaporization of the droplets. If the velocity of the reactants (aerosol) is too high, the droplets can pass through the laser beam without complete vaporization. If incomplete vaporization occurs, reactant droplets are collected in the collection system along with product particles.

Similarly, the size of the laser beam can be adjusted to control the reaction conditions. A larger laser beam can be used to help ensure that the droplets are vaporized. A larger laser beam, though, results in a larger reaction zone that can result in larger product particles. The overall reactant throughput can alter the effectiveness of the laser in vaporizing the droplets and may need to be considered also. Thus, droplet size, laser beam size and reactant velocity can be balanced to achieve desired product properties and reactant throughput.

The production of uniform product particle properties is a result of laser pyrolysis. In laser pyrolysis, the reaction conditions are determined by the laser, and the laser drives the reaction by providing the activation energy needed for the reaction. Generally, the reaction is somewhat exothermic. Thus, the reaction itself produces heat that can drive the reaction of additional reactants. A thermal or flame reaction generally is not desired in the context of laser pyrolysis because the reaction conditions tend to vary undesirably, the reaction zone is not well defined and the products are not rapidly quenched. The thermal reaction tends to produce larger particles with less size uniformity.

In addition, thermal reactions can extend into the reaction nozzle to the point of reactant mixing resulting in potential damage to the apparatus and possible safety concerns. The addition of inert gas in the reactant stream can moderate the reaction to reduce the likelihood of thermal reaction. In other words, the inert gas helps to dissipate the heat such that it is not available for thermal reaction. Appropriate amounts of inert gas may depend on the reactant throughput through the chamber. Thus, the reactant throughput and the amount of inert gas in the reactant stream can be adjusted to ensure that particles with desired properties are produced.

Above, general approaches to the production and use of aerosols in reaction chambers have been discussed. Several improved approaches were described. Next, adaptation of aerosol reaction delivery to apparatuses with an elongated reaction chamber designed for high production rates is described.

Adaptation of Aerosol Delivery to Elongated Reaction Chambers

Chemical reaction systems preferably can be scaled up to produce commercial quantities of materials. It has been discovered that commercial quantities of reaction products can be produced using a reaction chamber elongated in one dimension. By elongating the reaction chamber, the throughput of reactants and products can be increased without increasing the dead volume of the chamber that can become contaminated with unreacted compounds and/or reaction products. An elongated reaction chamber can be particularly effective for the conduction of laser pyrolysis experiments, where the elongated reaction chamber provides for more efficient use of resources. Laser pyrolysis with an elongated reaction chamber is described further in copending and commonly assigned U.S. patent application Ser. No. 08/808,850, now U.S. Pat. No. 5,989,514, entitled "Efficient Production of Particles by Chemical Reaction," incorporated herein by reference.

An elongated reaction chamber 650 is depicted schematically in FIGS. 25 and 26. In FIG. 25, reaction chamber 650 is shown as transparent to display structure within the chamber. A reactant channel 652 is located within block 654. In this embodiment, facets 656 of block 654 form a portion of conduits 658. Another portion of conduits 658 join at edge 660 with an inner surface of reaction chamber 662. Conduits 658 terminate at shielding gas inlets 664. Block 654 can be repositioned or replaced, depending on the reaction and desired conditions, to vary the relationship between reactant inlet 666 and shielding gas inlets 664. The shielding gases from shielding gas inlets 664 form blankets around the reactant stream originating from reactant inlet 666.

Reactant inlet 666 provides for the introduction of an aerosol into reaction chamber 662. While FIG. 25 displays an elongated reactant inlet to conform generally with the elongated reaction chamber 662, alternative shapes and designs for reactant inlet 666 can be used to deliver an aerosol. Suitable approaches for the introduction of an aerosol into elongated reaction chamber 662 are described further below. The dimensions of reactant inlet 666 can be selected based on the design of the aerosol delivery system in view of the reaction process involved. While the use of an inert shielding gas is preferred, various embodiments of the reactant inlet may eliminate shielding gas inlets 664. Nevertheless, the elongated shielding gas inlets can be maintained with any of a variety of reactant inlets.

Reaction chamber 662 includes an outlet 668 along the reactant stream for removal of products, any unreacted reactant compositions and any inert gases. For the performance of laser pyrolysis, tubular sections 670, 672 extend from reaction chamber 662. Tubular sections 670, 672 hold windows 674, 676 to define a laser beam path 678 through the reaction chamber 650. Tubular sections 670, 672 can include shielding gas inlets 680, 682 for the introduction of shielding gas into tubular sections 670, 672.

A particular embodiment of an elongated reaction chamber 700 for the performance of laser pyrolysis is depicted in FIG. 27. The reaction chamber can be modified for the performance of other types of reaction processes. Reactant inlet 702 is located at the bottom of reaction chamber 704. In this embodiment, the reactants are delivered from the bottom of the reaction chamber while the products are collected from the top of the reaction chamber. The configuration can be reversed with the reactants supplied from the top and product collected from the bottom, if desired.

Reaction chamber 704 is elongated along one dimension denoted in FIG. 27 by "w". In some embodiments, the elongated length of the reaction chamber is at least a factor of two greater than the width along "w." A light beam path 706 enters the reaction chamber through a window and traverses the elongated direction of the reaction chamber terminating at beam dump 708. In operation, the light beam intersects a reactant stream generated through reactant inlet 702. The top of the reaction chamber 704 opens into outlet duct 710. Outlet duct 710 carries the product particles out of the plane of the reactant stream to outlet port 712. Outlet port 712 includes flange 714 or the like for connection to a particle collection apparatus. Suitable particle collection apparatuses were described above.

An aerosol generator can be configured with an elongated reaction chamber in a variety of ways. First, a single aerosol nozzle can be installed within the elongated reaction chamber. The single nozzle can generate a radially symmetric aerosol or an elongated aerosol, as described further below. Blankets of shielding gas, in preferred embodiments, deflect portions of the aerosol away from the walls of the reaction chamber. Alternatively, multiple aerosol generators can be used, each of which producing a radially symmetric aerosol or an elongated aerosol.

In a first approach, a single aerosol nozzle with a radially symmetric output is configured with an elongated reaction chamber. While this approach may not make optimal use of the chamber, the elongated chamber is designed for a large throughput of product. The aerosol nozzle can deliver a considerable amount of reactant even without elongating the reactant stream. Thus, the large production capability of the apparatus can be used partially.

Figure 28:
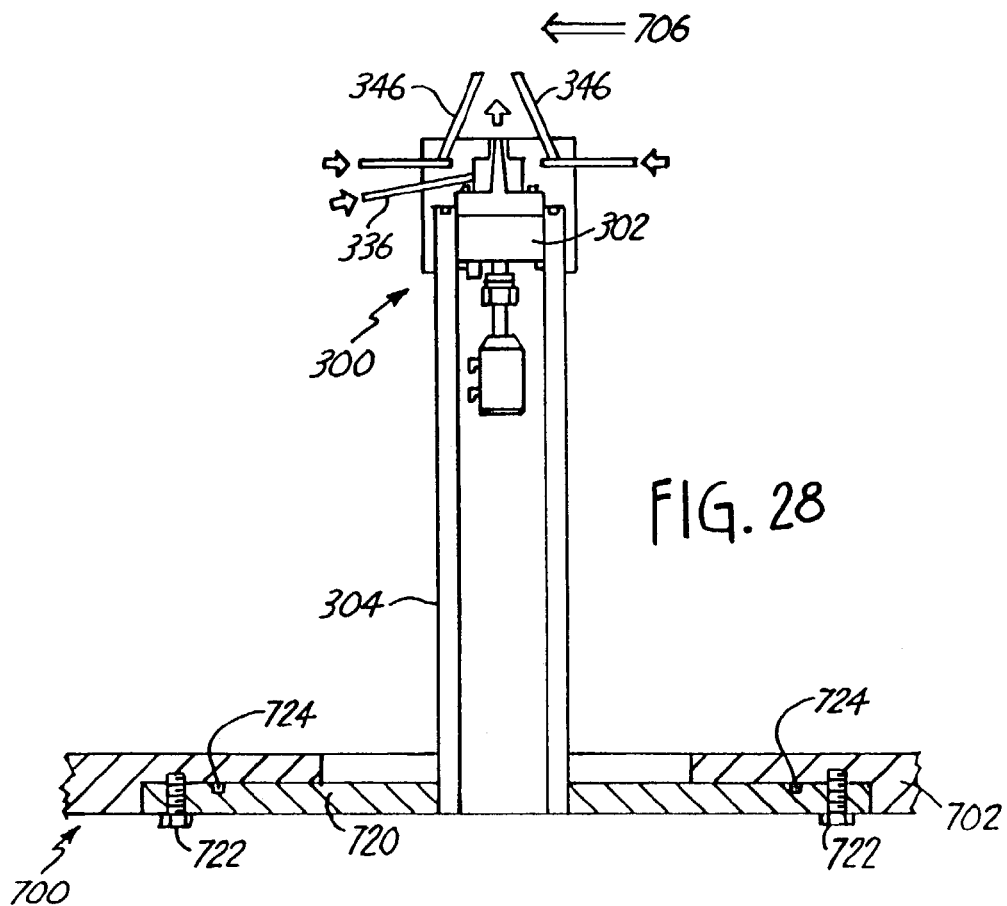
FIG. 28 is a fragmentary, sectional side view of an aerosol delivery apparatus of FIG. 3 attached to the reaction chamber of FIG. 27.

Referring to FIG. 28, a single aerosol delivery apparatus 300, as shown in cross section in FIG. 3, is mounted within reaction chamber 700 of FIG. 27. Mount 304 is connected to a base plate 720. Base plate 720 is fastened to reactant inlet 702 with bolts 722. An o-ring or the like, suitably shaped, can be placed within hollow 724 to form a seal between base plate 720 and reactant inlet 702. Light beam path 706 intersects the reaction stream just above projecting tubes 346.

In this embodiment, aerosol delivery apparatus 300 attached to baseplate 720 preferably inserts within a reactant inlet corresponding to expanded reactant inlet 666, as shown in FIGS. 25 and 26. Thus, the shielding gas is directed as a blanket along the elongated walls of the reaction chamber. The shielding gas helps to contain the spread of the aerosol along the thin dimension of the reaction chamber.

Reaction chamber 700, as shown in FIG. 27, with aerosol generator 300, as shown in FIG. 28, has been used to produce manganese oxide nanoparticles by laser pyrolysis. A Model 8700-120 ultrasonic aerosol nozzle from Sono-Tech, was used as aerosol generator 302. Further information on the generation of nanoparticles with the apparatuses in FIGS. 27 and 28 is found in commonly assigned and simultaneously filed U.S. patent application Ser. No. 09/188,770, now U.S. Pat. No. 6,506,493 to Kumar et al., entitled "Metal Oxide Particles," incorporated herein by reference.

Figure 29:
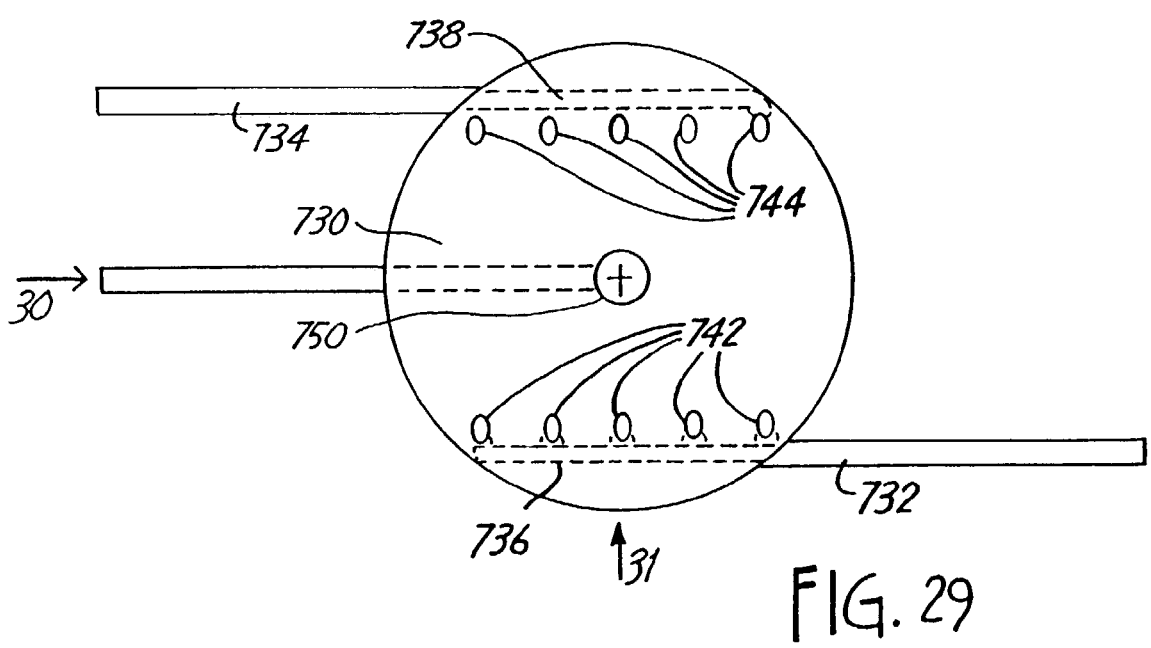
FIG. 29 is a top view of an alternative embodiment of the cap of FIG. 5 adapted for use in the elongated reaction chamber of FIG. 27.
Figure 30:
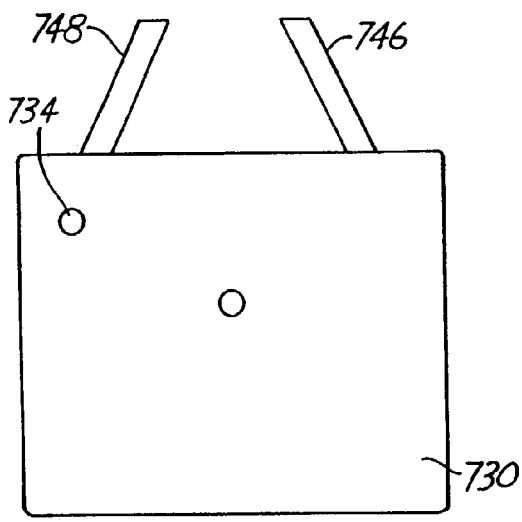
FIG. 30 is a side view of the cap of FIG. 29, along the direction "30" of FIG. 29.
Figure 31:
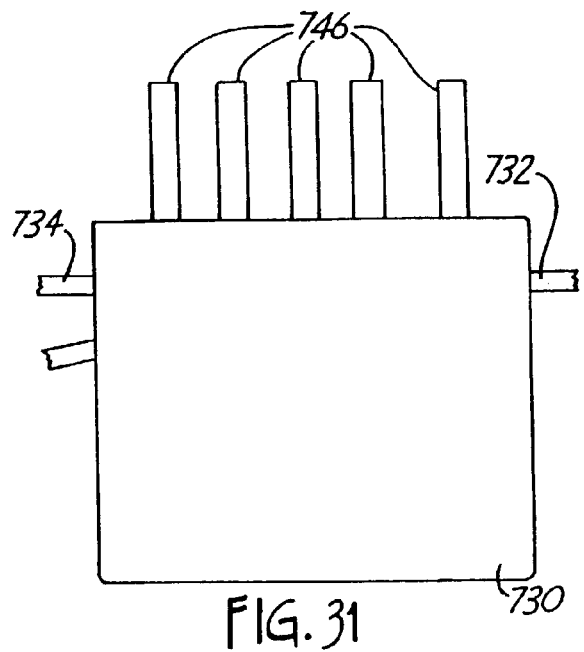
FIG. 31 is a side view of the cap of FIG. 29, along the direction "31" of FIG. 29.

In an alternative embodiment, the reactant stream can be elongated to some extent along the elongated reaction chamber by modifying cap 316 of FIGS. 3, 5 and 6. The modified cap 730 is shown in FIGS. 29–31. Inlet tubes 732, 734 connect to channels 736, 738 within cap 730. Inlet tubes 732, 734 are oriented along the elongated direction of the reaction chamber so that they do not contact the walls of the reaction chamber. Channels 736, 738 are shown as phantom lines in FIG. 29 since they are hidden structure in this view. Outlets 742, 744 connect with channels 736, 738, respectively. Projecting tubes 746, 748 can be connected to outlets 742, 744. Projecting tubes 746, 748, if present, preferably are angled toward the corresponding projecting tube on the opposite side of cap 730, as shown in FIGS. 30–31.

Gas directed through tubes 732, 734 passes through channels 736, 738 and out through outlets 742, 744 and projecting tubes 746, 748, if present. This gas (shearing gas) shears the aerosol coming from or near port 750. The shearing effect tends to elongate the aerosol along the direction of the elongation of reaction chamber. The shearing gas can be a reactant gas, a radiation absorbing gas, an inert gas or other suitable gas.

Another approach to the production of an elongated reactant stream involves the use of an elongated outlet for the aerosol delivery apparatus 96. If the aerosol is combined with a carrier gas prior to entrance into reaction chamber 662, an elongated reactant inlet can be used, as displayed in FIGS. 25 and 26. As the carrier gas flows to fill the space defined by the elongated inlet the aerosol flows along with the carrier gas. Thus, the aerosol conforms to the elongated shape of the inlet. The elongated inlet preferably conforms approximately to the shape of the elongated reaction chamber 662, although the reactant inlet generally is somewhat smaller than the cross section of the reaction chamber to avoid contamination of the chamber walls. An elongated inlet is suitable for use in combination with a variety of approaches for aerosol production outside of the reaction chamber such as those shown in FIGS. 12A, 12B, 13, and 24.

Figure 32A:
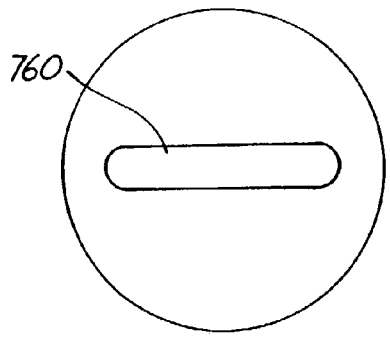
FIG. 32A is a top view of an alternative embodiment of cap of FIG. 5 with a roughly elliptical port.
Figure 32B:
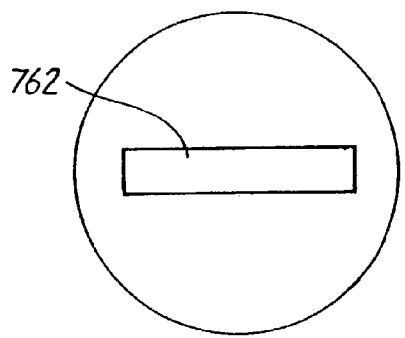
FIG. 32B is a top view of an alternative embodiment of the cap of FIG. 5 with a roughly rectangular port.

Aerosols can be produced within the reaction chamber such that the aerosol is elongated along the direction of the elongated reaction chamber. For example, an aerosol that is elongated in one dimension can be produced by using a non-circular orifice with a simplex atomizer nozzle, such as shown in FIG. 19, or suitable modifications of aerosol nozzles, such as shown in FIGS. 20-24. With respect to FIG. 19, orifice 590 can have a non-circular shape. The small noncircular orifice can be elliptical 760 (FIG. 32A), rectangular 762 (FIG. 32B), or other suitable elongated shape. Such slits have been used to produce spray guns and the like that have a generally flat spray pattern. When used with an elongated reaction chamber such as reaction chamber 650 of FIGS. 25 and 26, the aerosol generator with the elongated orifice can be mounted similarly to the ultrasonic aerosol generator of FIG. 28.

Figure 33:
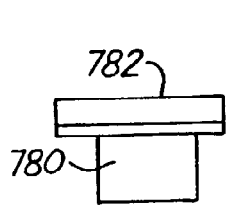
FIG. 33 is a front view of an alternative embodiment of a cap bushing for use with the aerosol delivery apparatus of FIG. 3.
Figure 34:
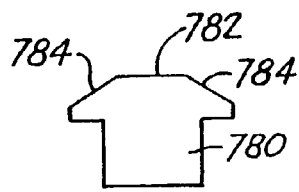
FIG. 34 is a side view of the bushing cap of FIG. 33.
Figure 35:
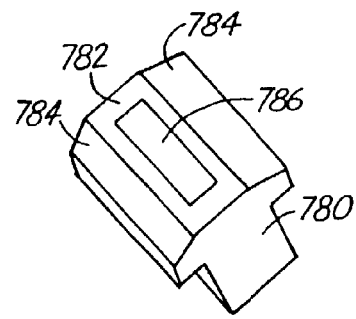
FIG. 35 is a perspective view of the bushing cap of FIG. 33.

With respect to an aerosol delivery apparatus 300 as shown in FIG. 3, a cap bushing 780 can be used that is elongated in one dimension, as shown in FIGS. 33–35. Cap bushing 780 has a flat top surface 782 connecting to sloped surface 784. Passage 786 opens upon top surface 782. Passage 786 preferably has an elongated shape corresponding to the elongated shape of the cap bushing. The cap bushing can have a variety of other elongated shapes analogous to the variations shown in FIGS. 9–11 for radially symmetric bushing caps.

Figure 36:
FIG. 36 is a fragmentary, sectional side view of an ultrasonic aerosol generator with a conical atomization surface.
Figure 37:
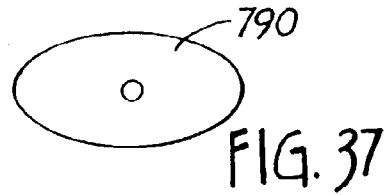
FIG. 37 is a top view of the conical atomization surface of FIG. 36.

If an ultrasonic aerosol generator is used with an atomization surface, the shape of the atomization surface can be varied to produce an aerosol elongated in a selected direction. For example with the ultrasonic aerosol generators of FIGS. 15 and 16, atomization surface 510 can be replaced with a conical shaped atomization surface 790, as shown schematically in FIGS. 36 and 37. A variety of other shapes can be used. The extended atomization surface can include multiple orifices, if desired. A cap bushing may not be used if the conical atomization surface is used with an ultrasonic aerosol generator inserted within the mount of FIG. 3. The use of a curved atomization surface results in a spread aerosol, but the velocity of the aerosol orthogonal to the light beam varies. Thus, the residence time in the light beam may be different at different positions within the light beam.

Figure 38:
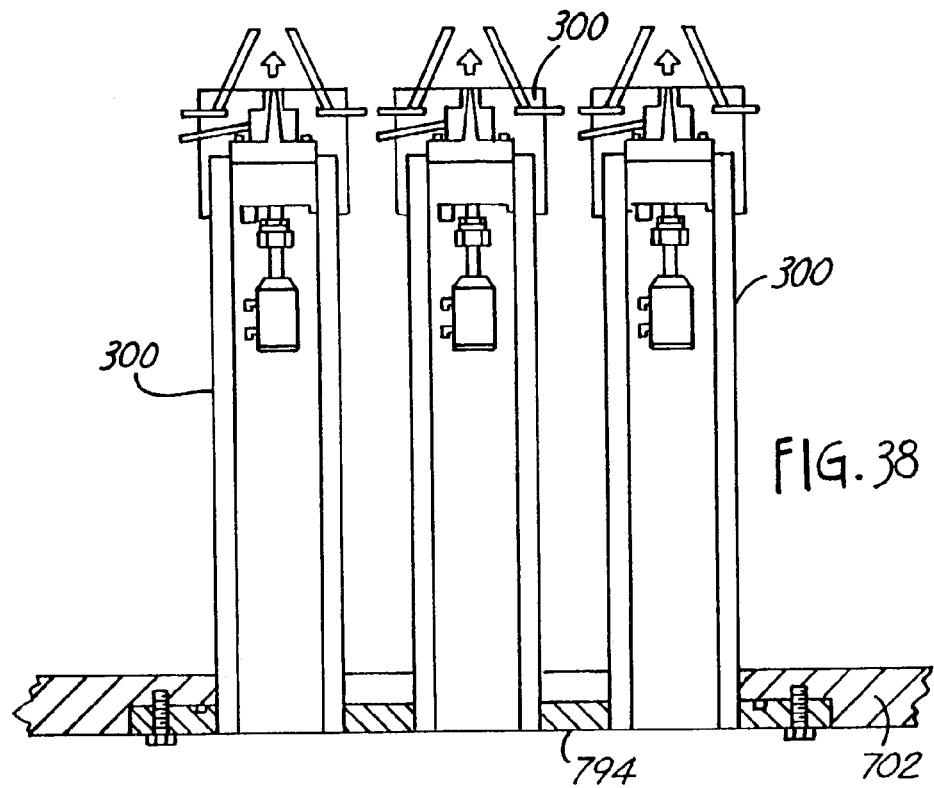
FIG. 38 is a fragmentary, sectional view of an embodiment with three aerosol delivery apparatuses of FIG. 3 being used with the reaction chamber of FIG. 27, where the cross section is taken through the center of the three aerosol delivery apparatuses.

Another approach for exploiting elongated reaction chamber 662 involves the use of multiple aerosol delivery apparatuses 96 (FIG. 1), or similarly, multiple aerosol generators within an aerosol delivery apparatus. For example, with an ultrasonic aerosol delivery apparatus, such as shown in FIG. 3, three ultrasonic aerosol delivery apparatuses 300 can be used, as shown in FIG. 38. Each apparatus 300 may or may not be modified to produce a non-symmetric aerosol based on the approaches described above. Aerosol delivery apparatuses 300 are attached to a suitably modified base plate 794. Base plate 794 is attached to reactant inlet 702. Two aerosol delivery apparatuses 300 or more than three aerosol delivery apparatuses 300 can be used, as desired, if the dimensions of the components allow for the desired configuration. The size of the respective components may need to be altered, if possible, to accommodate a desired number of aerosol delivery apparatuses.

Figure 39:
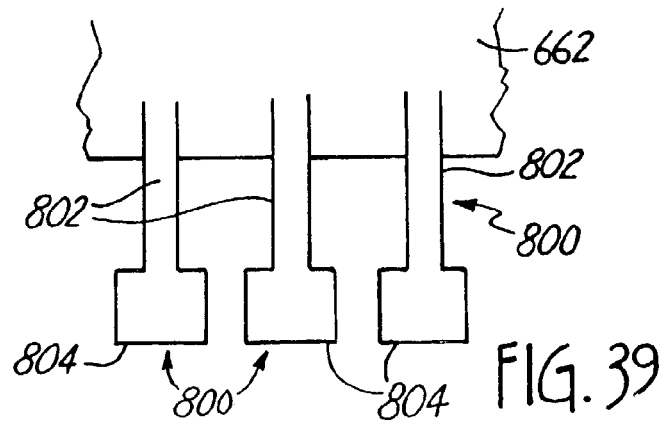
FIG. 39 is a fragmentary, sectional view of an embodiment of a reaction system with three aerosol delivery apparatuses being used with an elongated reaction chamber, this embodiment suitable for use with various aerosol delivery apparatus embodiments.

Multiple aerosol delivery apparatuses can be used with other types and/or configurations of aerosol delivery apparatuses than shown in FIG. 38. Referring to FIG. 39, three aerosol delivery apparatuses 800 are shown leading into elongated reaction chamber 662. Each aerosol delivery apparatus includes a reactant inlet 802 and an aerosol generator 804. Each reactant inlet 802 can be configured to deliver a radially symmetric aerosol or a non-radially symmetric aerosol. The reactant inlets are arranged in an array generally oriented along the elongated dimension of the reaction chamber, although reactant inlets 802 may or may not be in a linear alignment. This configuration is suitable for use, for example, with the aerosol delivery configurations of FIGS. 12A, 12B and 13 as well as the aerosol delivery apparatuses shown in FIGS. 14 and 18–24.

Figure 40:
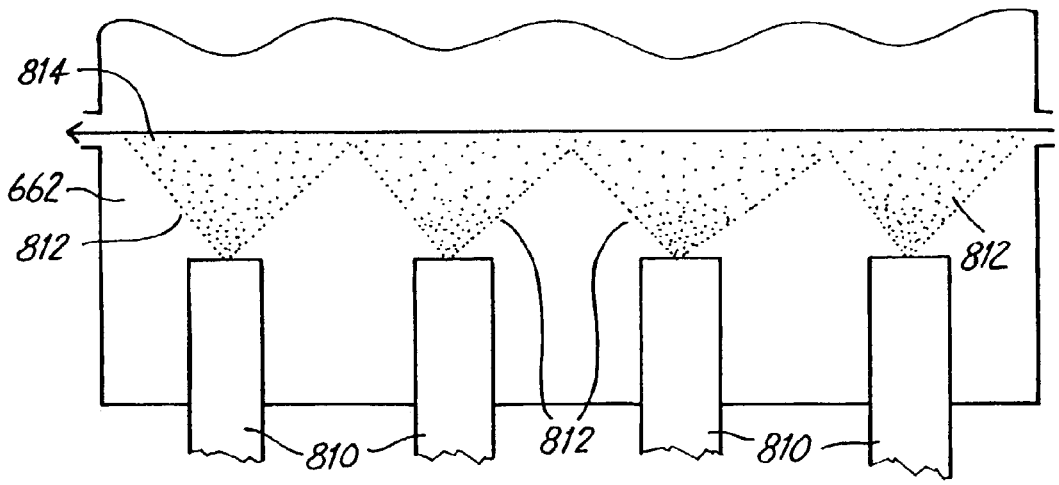
FIG. 40 is a fragmentary, sectional view of an embodiment with a plurality of aerosol delivery apparatuses producing fan shaped aerosol sprays, the cross section is taken through the center of the aerosol delivery apparatuses.

In a particularly preferred embodiment of the configurations in FIGS. 38 and 39, each aerosol delivery apparatus produces a fan shaped aerosol that takes partial advantage of the elongated shape of the reaction chamber. Thus, collectively the laser pyrolysis takes advantage of a greater portion of the reaction chamber. Such an embodiment is shown schematically in FIG. 40. Four aerosol generators 810 are in a generally linear alignment along the width of elongated reaction chamber 662. Each aerosol generator 810 produces a fan shaped aerosol 812 that partially overlap with the aerosol form adjacent aerosol generators 810. Aerosols 812 form a stream of reactants along light beam path 814. Preferably, the combined aerosol stream covers more than about 50 percent, and preferably more than about 80 percent of the cross sectional area of light beam path 814 within the reaction chamber, orthogonal to the reactant stream. Any suitable aerosol generators described above can be used with appropriate adaptation to produce a fan shaped aerosol.

Figure 41:
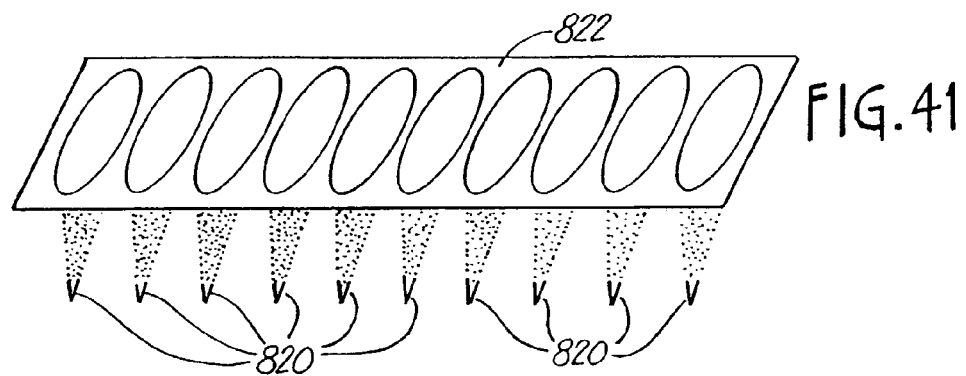
FIG. 41 is a schematic, perspective view of a plurality of aerosol delivery apparatuses producing elliptical aerosol sprays that cover a majority of the cross section of the laser beam within the reaction chamber.

Referring to FIG. 41, a similar embodiment involves the use of a plurality of aerosol generators 820 producing ellipsoidal aerosol sprays. Aerosol generators 820 are arranged to cover a significant portion of the cross section of the light beam 822 within the reaction chamber.

Figure 42:
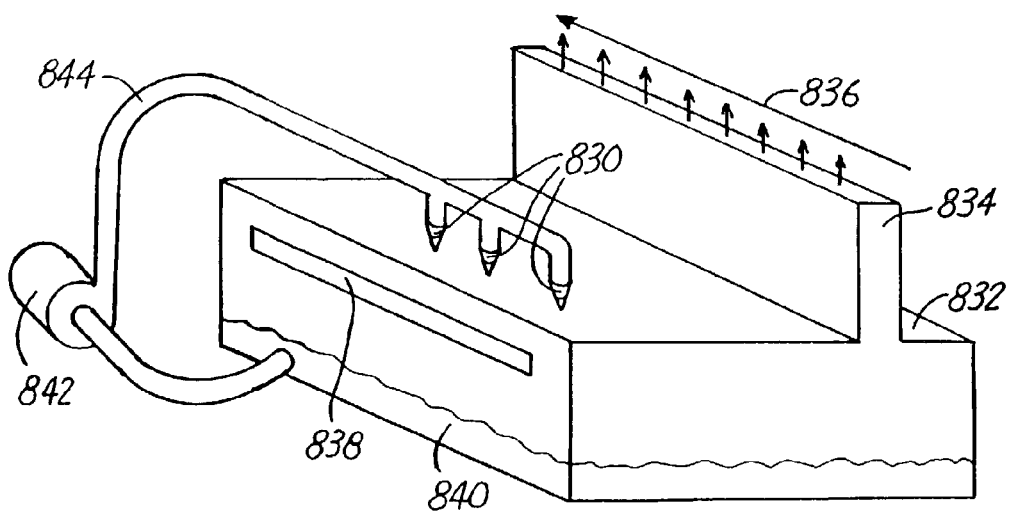
FIG. 42 is a perspective, schematic view of a generalized embodiment of the aerosol delivery apparatus of FIG. 12B wherein a plurality of aerosol generators are used and wherein the reactant inlet is elongated.

Multiple aerosol generators can also be used in a generalization of the embodiment shown in FIG. 12B, as shown in FIG. 42. Three aerosol generators 830 produce an aerosol within aerosol chamber 832. Other numbers of aerosol generators 830 can be used, as desired. Aerosol chamber is connected to an elongated reactant channel 834 that leads to an elongated reaction chamber. Elongated reactant channel preferably is elongated to generally conform to the elongated reaction chamber and light beam 836.

Aerosol chamber 832 is further connected to a gas inlet 838. Carrier gas can be introduced through gas inlet 838. The carrier gas can be a reactant gas, a light (laser) absorbing gas, an inert gas or a mixture thereof. Gas inlet can be connected to one or more gas and/or vapor sources, as described above. Aerosol chamber 832 can hold a supply of liquid 840. Liquid 840 can be circulated to aerosol generators 830 by way of pump 842 and tubing 844. Additional solution and/or solvent can be added to aerosol chamber 832 and/or supplied to aerosol generators 830, to provide for continuous aerosol delivery and delivery of liquid with a composition within a desired range of concentrations.

The approaches for producing an aerosol with a non-circular aspect, described above, can be combined, if desired. For example, the multiple aerosol delivery apparatuses shown in the configurations of FIGS. 38 and 39 can each have modifications to produce non-circular aerosols. The combination of approaches to forming an extended aerosol can be used to obtain a substantially uniform pattern of droplets flowing across the reaction zone cross section. Preferably, excluding about 20 percent of the cross sectional area near the chamber walls, the pattern of droplets/particles in the aerosol varies by no more than about 50 percent and preferably no more than about 25 percent over the cross sectional area.

The embodiments described above are intended to be illustrative and not limiting. Other embodiments are within the claims below. Although the present invention has been described with reference to preferred embodiments, workers skilled in the art will recognize that changes may be made in form and detail without departing from the spirit and scope of the invention.

What is claimed is:

1. A method of producing particles, the method comprising introducing a reactant stream into a reaction chamber, the reactant stream intersecting a radiation beam, the reactant stream comprising an aerosol, a vapor metal and a compound that absorbs sufficient radiation energy to drive a reaction resulting in particle formation, wherein the aerosol is generated with an aerosol generator.

2. The method of claim 1 wherein the aerosol generator comprises a two fluid external mix atomizer.

3. The method of claim 2 wherein the two fluid external mix atomizer is a gas-blast atomizer.

4. The method of claim 1 wherein the aerosol generator comprises a gas atomizer.

5. The method of claim 1 wherein the aerosol generator comprises a two fluid internal mix atomizer.

6. The method of claim 1 wherein the aerosol generator comprises a simplex atomizer.

7. The method of claim 1 wherein the aerosol generator comprises a Venturi based atomizer.

8. The method of claim 1 wherein the particles are quenched rapidly after leaving a reaction zone that comprises an intersection of the radiation beam and the reactant stream.

9. The method of claim 8 wherein the laser comprises a carbon dioxide laser.

10. The method of claim 1 wherein the radiation beam is produced by a laser.

11. The method of claim 1 wherein the aerosol is generated with a neat liquid.

12. The method of claim 1 wherein the aerosol is generated with a solid dissolved in a liquid.

13. The method of claim 1 wherein the aerosol comprises a metal.

14. The method of claim 1 wherein the aerosol comprises a plurality of metals.

15. The method of claim 1 wherein the aerosol comprises silicon.

16. The method of claim 1 wherein the reactant stream further comprises a vapor reactant comprising a plurality of metal.

17. A method of producing particles, the method comprising introducing a reactant stream into a reaction chamber, the reactant stream intersecting a radiation beam path, the reactant stream comprising a vapor and an aerosol comprising a metal reactant wherein the vapor forms a vapor stream in a delivery tube oriented directly into the reaction chamber and wherein the aerosol flows into the vapor stream from a direction that is not oriented toward the reaction chamber.

18. The method of claim 17 wherein the aerosol is generated within a chamber in fluid communication with the delivery tube leading to the reaction chamber.

19. The method of claim 17 wherein the aerosol is generated within a side channel leading to the delivery tube.

20. The method of claim 17 wherein the aerosol is drawn into a gas flow.

* * * * *